(12) United States Patent
Athan

(10) Patent No.: US 9,247,215 B1
(45) Date of Patent: Jan. 26, 2016

(54) LASER SENSOR SYSTEM

(75) Inventor: Stephan P. Athan, Tampa, FL (US)

(73) Assignee: Custom Manufacturing & Engineering, Inc.

(*) Notice: Subject to any disclaimer, the term of this patent is extended or adjusted under 35 U.S.C. 154(b) by 1626 days.

(21) Appl. No.: 11/409,290

(22) Filed: Apr. 21, 2006

Related U.S. Application Data

(60) Provisional application No. 60/673,821, filed on Apr. 22, 2005.

(51) Int. Cl.
*H04N 7/18* (2006.01)
*G01C 3/04* (2006.01)

(52) U.S. Cl.
CPC . *H04N 7/181* (2013.01); *G01C 3/04* (2013.01)

(58) Field of Classification Search
CPC ...... H04N 7/18–7/188; G08B 13/194–13/196; G08B 15/00; F41G 3/00; G05B 2219/37281; G01C 3/00; G01C 3/02; G01C 3/04; G03B 13/20; G03B 13/22; G01S 7/483; G08C 2201/31; G06F 3/017; G06F 3/0346
USPC ........ 348/143–159, 370–371, 211.99–211.14
See application file for complete search history.

(56) References Cited

U.S. PATENT DOCUMENTS

| | | | |
|---|---|---|---|
| 3,727,207 A * | 4/1973 | Missio | G08B 13/187 340/557 |
| 4,049,969 A * | 9/1977 | Salonimer | G01S 17/74 250/458.1 |
| 4,319,332 A | 3/1982 | Mehnert | |
| 4,903,009 A | 2/1990 | D'Ambrosia | |
| 4,952,911 A | 8/1990 | D'Ambrosia | |
| 5,278,423 A | 1/1994 | Wangler | |
| 5,500,525 A | 3/1996 | Saban | |
| 5,517,201 A | 5/1996 | Thompson, Jr. | |
| 5,910,767 A * | 6/1999 | Frucht | G01S 17/023 250/236 |
| 5,938,717 A | 8/1999 | Dunne | |
| 6,057,909 A * | 5/2000 | Yahav et al. | G01C 11/025 313/103 CM |
| 6,121,600 A * | 9/2000 | Saldana | G01S 7/481 250/214 VT |
| 6,188,319 B1 | 2/2001 | Frucht | |
| 6,195,310 B1 | 2/2001 | Morgan | |
| 6,317,266 B1 * | 11/2001 | Yoshimura | G02B 27/20 345/157 |
| 6,512,993 B2 | 1/2003 | Kacyra | |
| 7,463,304 B2 * | 12/2008 | Murray | G03B 17/00 348/211.4 |
| 8,830,576 B1 * | 9/2014 | Morton | G02B 23/18 359/399 |
| 2002/0057347 A1 * | 5/2002 | Urisaka | H04N 7/147 348/211.4 |
| 2003/0081127 A1 * | 5/2003 | Kirmuss | B60R 11/02 348/207.99 |
| 2005/0123883 A1 * | 6/2005 | Kennen | F41G 3/2611 434/11 |
| 2005/0206729 A1 * | 9/2005 | Chang | G08B 13/19619 348/155 |
| 2005/0268521 A1 * | 12/2005 | Cox | F41G 1/38 42/130 |
| 2006/0186205 A1 * | 8/2006 | Page | G06K 7/10851 235/462.22 |

FOREIGN PATENT DOCUMENTS

WO  WO 2004/036246 A1  4/2004

* cited by examiner

*Primary Examiner* — Pritham Prabhakher
(74) *Attorney, Agent, or Firm* — Frijouf, Rust & Pyle P.A.

(57) ABSTRACT

A device is disclosed for detecting and imaging an object comprising a sensor node including a sensor for sensing the object and a camera for recording an image of the object. A wireless sensor radio is connected to the camera for transmitting the recorded image of the object to a display node for displaying the image of the object at a remote location.

8 Claims, 18 Drawing Sheets

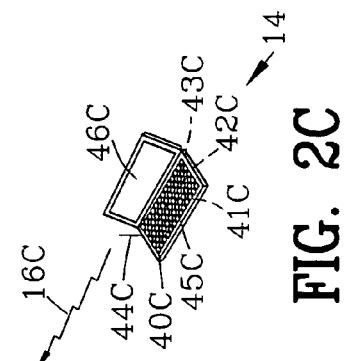
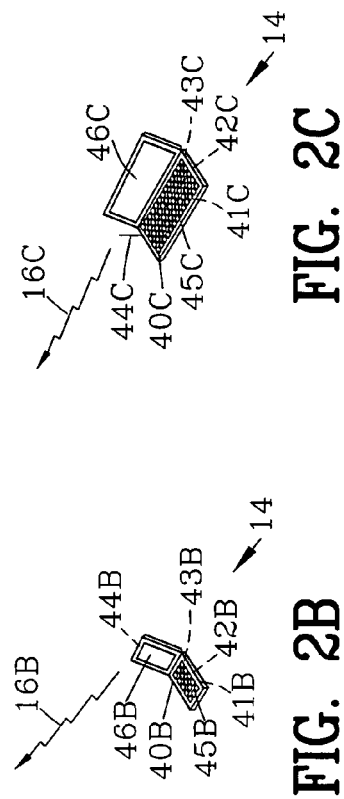
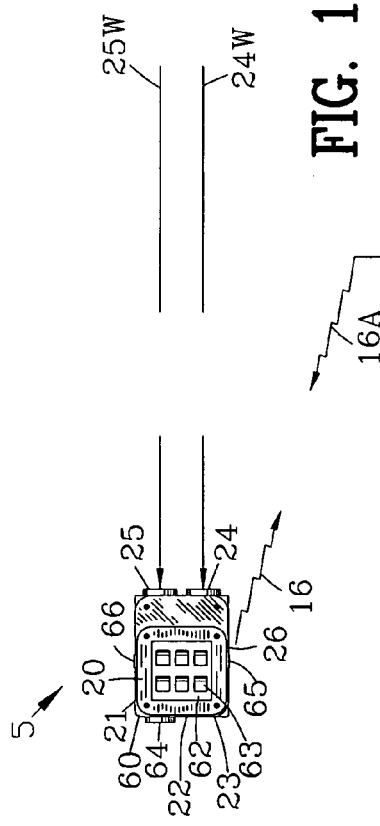
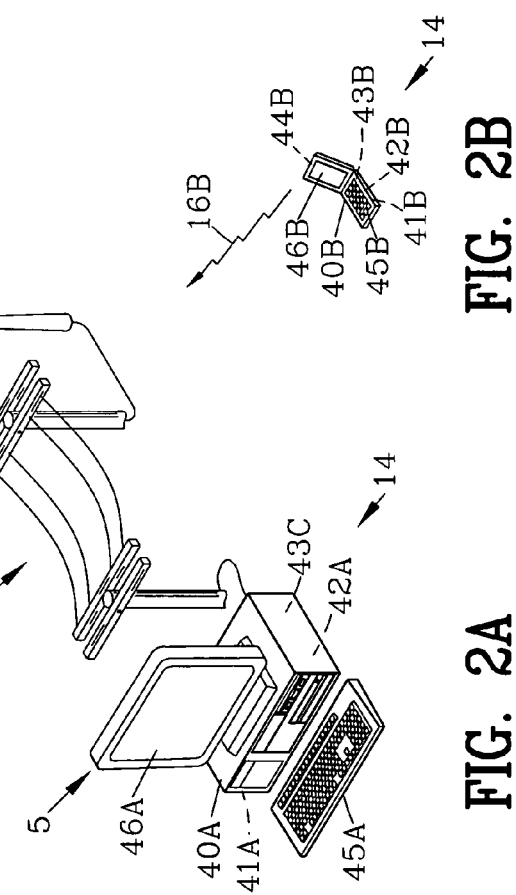
FIG. 1
FIG. 2A
FIG. 2B
FIG. 2C

LASER SENSOR SYSTEM

CROSS-REFERENCE TO RELATED APPLICATIONS

This application claims benefit of U.S. Patent Provisional application Ser. No. 60/673,821 filed Apr. 22, 2005. All subject matter set forth in provisional application Ser. No. 60/673,821 is hereby incorporated by reference into the present application as if fully set forth herein.

BACKGROUND OF THE INVENTION

1. Field of the Invention

This invention relates to remote sensing and more particularly to an improved device for detecting and imaging an object and for transmitting the recorded image of the object to a display node at a remote location.

2. Background of the Invention

During the last decade, the art of remote sensing has been applied in a wide variety of applications and uses. Remote sensing devices may be classified as either passive remote sensing devices or active remote sensing devices. In a passive remote sensing device, a passive sensor responds to an emission from an object. The emission from the object may be an acoustical emission or an electromagnetic transmission from the object.

In an active remote sensing device, an acoustical or an electromagnetic pulsed beam is transmitted from the active remote sensing device. A sensor in the active remote sensing device detects a reflection of the pulsed beam for the object interrupting the beam. The active remote sensing device may provide the distance to the object by timing the duration between the transmission of the pulsed beam and the detection of a reflection of the pulsed beam from an object interrupting the beam.

Many passive remote sensing devices sensitive to acoustical emission or infrared electromagnetic transmission have been used in intrusion alarms, perimeter surveillance and the like. Other passive remote sensing devices have been used to photograph an object.

One particular problem with many of the remote sensing devices is the false actuation of the remote sensing device. The remote sensing devices are susceptible to two different false actuations. A first type of false actuation occurs when the remote sensing beam indicate the beam is interrupted when in fact the beam has not been interrupted by any object. This first type of false actuation may be referred to as a false-false actuation. A second type of false actuation occurs when an undesired object interrupts the remote sensing beam. For example, in some instances, it is desirable to determine whether an animal or human being has interrupted in the remote sensing beam.

The following United States patents represent some of the attempts of the prior art to provide a remote sensing device for the remote sensing art.

U.S. Pat. No. 3,727,207 to D. V. Missio et al. discloses an optical intrusion detector which in one package employs a radar-type concept with a time interval logic circuit to measure small changes in transmitted and received signals. A plurality of measured optical pulses are transmitted to a passive reflective target, such as a tree, fence, or other dense object, and reflected back to the same source. The rate of change between the transmitted and received—pulses is measured. When the rate of change in the transmitted and received signals varies from .a predetermined level, an alarm is actuated. 'The time interval logic employed in the detector employs three flip-flop circuits and associated circuitry. The associated circuitry with a first flip-flop circuit will cause a third flip-flop circuit to be actuated to generate an. alarm signal when the time interval between the pulses transmitted and received exceeds a predetermined level. A second flip-flop circuit functions in combination with the third flip-flop circuit to indicate when a decrease in the time between the transmitted and-received pulses is measured to actuate an alarm.

U.S. Pat. No. 4,319,332 to W. Mehnert discloses a monitoring method and apparatus for monitoring surfaces and spaces as well as objects present therein. A pulse transmitter delivers, by means of a beam deflection element, in a defined sequence and in defined directions pulsed directional beams, and received beams are directionally selectively received. Distance vectors and their changes are evaluated in a computer for surface or terrain, space and object measurement and/or object recognition and/or sounding of an alarm.

U.S. Pat. No. 4,903,009 to G. C. D'Ambrosia et al. discloses an intrusion detection device that comprises a radiation emitter arranged to project a beam of infrared radiation toward a field of view and means for receiving the radiation of the beam reflected from the field of view. The receiving means is arranged to generate a signal indicative of the distance from the device at which the beam has between reflected by the field of view during a selected time period. Means is also provided for storing a reference signal that is indicative of the distance of reflection of the beam from the field of view during a reference time period. Further means is provided for comparing a signal from a selected time period with the reference signal and for generating an output signal if the signal differs from the reference signal in a preselected manner.

U.S. Pat. No. 4,952,911 to G. C. D'Ambrosia et al. discloses a scanning intrusion detection device capable of monitoring a large volume of either interior or exterior space from a single relatively inexpensive unit. This intrusion detection device comprises a radiation emitter arranged to scan a beam of infrared radiation about a field of view and means for receiving the radiation of the beam reflected from the field of view. The receiver is arranged to generate a signal indicative of the distance from the device at which the beam has been reflected for each of a plurality of azimuth sectors of the field of view during a selected time period. A ram is also provided for storing a plurality of reference signals that are indicative of the distance of reflection of the beam from each azimuth sector of the field of view during a reference time period. The signals from a selected time period are compared with the reference signals and an output signal is generated if one of the signals is different from the respective reference signal.

U.S. Pat. No. 5,278,423 to R. J. Wangler discloses an object sensor and method using pulsed laser range imaging technology adapted for controlling an agricultural spraying system. A single laser sensor employs a continuously scanned pulsed laser transmitter and optical receiver to determine the presence or absence of foliage in predetermined spray zones to selectively control spraying only in those spray zones where foliage has been sensed. Range and distance data are also collected and stored in a microprocessor for use in determining the appropriate zones requiring spraying.

U.S. Pat. No. 5,500,525 to I. Saban discloses a method of protecting a predetermined area comprising the steps of providing a base station positioned essentially at the center of the area to be protected. The base station is provided with scanning laser beam generating and receiving means, image and signal processing units, memory means, voice receiving and transmitting means and image viewing means. A laser beam is generated by the base station to be reflected from the surveyed area into the receiving means of the base station. The received reflected light is processed to generate an image of the surveyed area. One or more scanned images is stored in memory means to be used as reference images. A real-time scanned image may be compared with one or more stored reference images at any given time to determine changes which have occurred on the image which exceed predetermined threshold values, and alerting the operator of the base station of any such changes. One or more moving stations may be provided with emitting/receiving laser generating means and signal processing means, and causing the moving station to generate an emitted signal to identify the moving station. A recognition means is provided within the signal processing means of the base station to recognize the signal generated by the moving station as a friendly signal, and to alert the operator of the base station whether a change in the image of the scanned area belongs to a friendly or to an unfriendly force.

U.S. Pat. No. 5,517,201 to E. E. Thompson, Jr. discloses a plurality of monitors distributed throughout a surveillance area chosen in the wild habitat of animals by a sportsman. Each monitor transmits at least one infrared signal to the surveillance area. An animal intersected the beam reflects incident radiation on a detector situated in the same housing as the transmitter. When the signal is detected, an RF transmitter is energized by an RF receiver at a remote site. The RF receiver includes a clock for establishing the date and time of the transmitted signal. In the preferred embodiment, each monitor is provided with three infrared transmitters, each with an associated receiver. The transmitters are driven by encoded signals that uniquely identify each transmitter of the monitor as well as the transmitters of all other monitors that may be in use thereby to enable detected directional movement in the surveillance area. The receiver includes a decoder for establishing the identity of the received RF signal. The storage medium is used to allow recovery of detected events through a read command.

U.S. Pat. No. 5,910,767 to Y. Frucht discloses a light beam, preferably from a laser, reflected from a target, which is a potential intruder. The time period required for the beam to return to a light detector, as well as the intensity of the reflected light, is recorded. The system includes a computer and software for analyzing the measurements of distance and intensity of reflected light. The algorithm for detecting the presence of an intruder is based on changes in the measured distance and/or intensity of reflected light from initial measurements made during a "learning" period. The system tracks targets using data collected in consecutive searches of the area to be protected. Preferably, an alarm is sounded and/or a video camera is slaved to the system.

U.S. Pat. No. 5,938,717 to J. G. Dunne et al. discloses a system for automatically capturing an image of a moving vehicle and recording data parameters, such as date, time, speed operator, location, etc. on the image. A capture window comprises a predetermined range of distances of the system from the moving vehicle can be set by the operator so that the image of the moving vehicle is automatically captured when it enters the capture window. The capture window distance can be entered manually through a keyboard or automatically using the laser speed gun. Automatic focusing is provided using distance information from the laser speed gun. A database is included to allow the user to search for specified parameters. Data records can be flagged for issuance of citations. A separate office unit is disclosed for retrieving and sorting data records so that field units are not occupied with such tasks. The office unit can be separately connected to licensing databases to retrieve information for issuance of citations.

U.S. Pat. No. 6,188,319 to Y. Frucht discloses an intruder detection system for detecting the presence of an intruder in a protected area. A light beam, preferably from a laser, is reflected from a target, which is a potential intruder. The time period required for the beam to return to a light detector, as well as the intensity of the reflected light, is recorded. The system includes a computer and software for analyzing the measurements of distance and intensity of reflected light. The algorithm for detecting the presence of an intruder is based on changes in the measured distance and/or intensity of reflected light from initial measurements made during a learning period. The system tracks targets using data collected in consecutive searches of the area to be protected. Preferably, an alarm is sounded and/or a video camera is slaved to the system.

U.S. Pat. No. 6,195,310 to A. Morgan, II discloses a monitoring device for assisting hunter's and other persons seeking to view animals in the wild along game trails and the intersection of multiple game trails. The monitoring device includes a monitoring assembly for detecting movement of an animal on or along the trail and a speaker used for generating an alerting sound to alert the individual of the approaching animal long before the animal appears. To assist individuals positioned at the intersection of multiple game trails the monitoring device is provided with a selection mechanism for allowing the user to select one sound from a number of different sounds. To prevent the sound from spooking the animal in the wrong direction the speaker is connected to the monitoring assembly by a length of cable greater than twenty feet.

U.S. Pat. No. 6,512,993 to B. K. Kacyra et al. discloses an integrated system for generating a model of a three-dimensional object. A scanning laser device scans the three-dimensional object and generates a point cloud. The points of the point cloud each indicate a location of a corresponding point on a surface of the object. A first model is generated, responsive to the point cloud that generates a first model representing constituent geometric shapes of the object. A data file is generated, responsive to the first model that can be inputted to a computer-aided design system.

Therefore, it is an object of the present invention to provide an improved device for detecting and imaging an object that overcomes many of the deficiencies of the above United States patents and provides a significant contribution to the art.

Another object of this invention is to provide an improved device for detecting and imaging an object having a sensing node for detecting and imaging an object and for transmitting the image by a wireless transmitter to a display node at remote location.

Another object of this invention is to provide an improved device for detecting and imaging an object having a sensing node for detecting and imaging an object incorporating a passive or an active sensor for detecting an object.

Another object of this invention is to provide an improved device for detecting and imaging an object having a sensing node for determining the range of the object.

Another object of this invention is to provide an improved device for detecting and imaging an object having a plurality of sensing nodes for detecting and imaging an object with each of said plurality of sensing nodes communicating with the remaining plurality of sensing nodes.

Another object of this invention is to provide an improved device for detecting and imaging an object having a display node for displaying the image of the object at remote location.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to an improved device for detecting and imaging an object comprising a sensor node and a display node. The sensor node includes a sensor microcomputer and a sensor connected to the sensor microcomputer for sensing the object. A camera is connected to the sensor microcomputer for recording an image of the object. A sensor radio is connected to the sensor microcomputer for transmitting the recorded image of the object. The display node includes a display microcomputer and a display radio connected to the display microcomputer for receiving the recorded image of the object. A display device displays the image of the object. The device may include a plurality of sensor nodes for communicating with the display node.

In a more specific example, the sensor and display radios are wireless radio frequency transceivers selected from the group consisting of a 802.15 wireless transceiver, a cellular transceiver and a satellite transceiver. The sensor may be an active sensor or a passive sensor. Preferably, the sensor is selected from the group consisting of a laser sensor for sensing a laser beam from the object, a range sensor for sensing the range of the object, a motion sensor for sensing a motion of the object, a presence sensor for sensing a presence of the object, a heat sensor for sensing a heat emission from the object, an infrared sensor for sensing an infrared emission from the object, an acoustic sensor for sensing an acoustical output from the object, an ultrasonic sensor for sensing an ultrasonic output from the object, a vibration sensor for sensing the level of vibration from the object, an acceleration sensor for sensing the level of acceleration of the object, a pressure sensor for sensing the level of pressure from the object, an inclination sensor for sensing the level of inclination of the object, a magnetic sensor for sensing a magnetic field of the object, an aroma sensor for sensing an aroma from the object, a sonar sensor for sensing a sonar signal from the object, a radar sensor for sensing a radar signal from the object, a radio frequency sensor for sensing a the radio frequency signal from the object, a magnetic compass for sensing a magnetic direction; and a light sensor for determining the level of ambient light.

In one example, the sensor includes a laser sensor having a laser range finder coupled to the camera for actuating the camera and for determining the range of the object. In another example, the sensor includes a light sensor for sensing an ambient light condition. A light emitting device illuminates the object for enabling the camera to record an image of the object in a low light condition.

The camera comprises an electronic imaging device for imaging the object with a matrix of electronic pixels. In one example, the camera includes a night vision unit coupled to the camera for enabling the camera to record an image of the object in a low light condition. In another example, a second camera is connected to the sensor microcomputer for recording a second image of the object for determining the velocity of the object from the images from the cameras.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which:

FIG. 1 is a side view of a sensor node of the present invention detecting and imaging an object;

FIG. 2A is an isometric view of a first embodiment of the present invention illustrating a display node for presenting a view of the object shown as a computer;

FIG. 2B is an isometric view of a second embodiment of the present invention illustrating a display node for presenting a view of the object shown as a cellular telephone;

FIG. 2C is an isometric view of a third embodiment of the present invention illustrating a display node for presenting a view of the object shown as a mobile computer;

Similar reference characters refer to similar parts throughout the several Figures of the drawings.

DETAILED DISCUSSION

Figure 3:
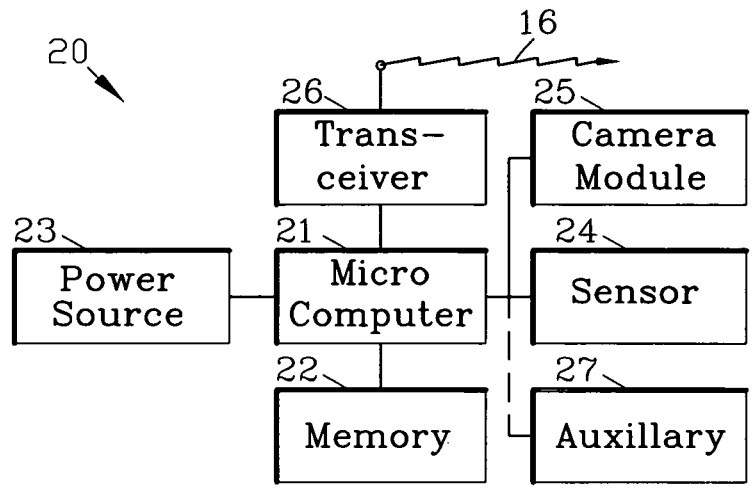
FIG. 3 is a block diagram of the sensor node of FIG. 1.

FIGS. 1 and 2 illustrate a device 5 of the present invention for detecting and imaging an object 10 within a region 12. The device 5 comprises at least one sensor node 20 for detecting and imaging the object 10 within the region 12 as shown in FIG. 1. As will be described in greater detail hereinafter, the device 5 preferably comprises a plurality of sensor nodes 20 and/or various configurations of the sensor nodes 20.

The sensor note 20 transmits the image of the object 10 to a display node 40A at a remote location 14 as indicated by the arrow 16A as shown in FIG. 2. The display node 40A may take various forms and configuration with three configurations shown as display nodes 40A-40C shown in FIG. 2A-2C. The display nodes 4 OA-40C receives the image of the object 10 at the remote location 14 as indicated by the arrows 16A-16C. The display nodes 40A-40C shown in FIGS. 2A-2C represent three different types of display nodes but it should be understood that numerous other types of display nodes 20 may be used in the device 5 of the present invention.

FIG. 3 is a block diagram of the sensor node 20 of FIG. 1. The sensor node 20 includes a sensor microcomputer 21 having a memory 22 powered by a power source 23. A sensor 24 is connected to the sensor microcomputer 21 for sensing the object 10. A camera 25 is connected to the sensor microcomputer 21 for recording an image of the object 10. A wireless sensor radio 26 is connected to the sensor microcomputer 21 for transmitting the image of the object 10 to one of the display nodes 40A-40C. As will be described in greater hereinafter, the sensor node 20 may include an auxiliary unit 27.

Figure 4:
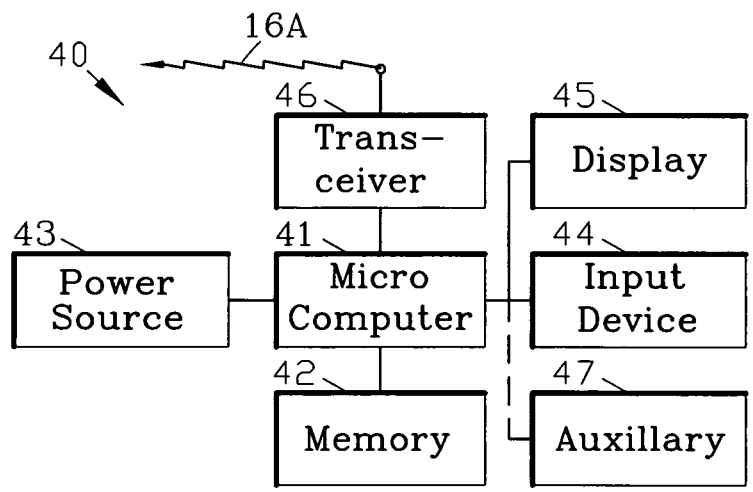
FIG. 4 is a block diagram of the display nodes of FIGS. 2A-2C.

FIG. 4 is a block diagram of the display nodes 40A-40C of FIGS. 2A-2C. The display node 40 includes a display microcomputer 41 having a memory 42 powered by a power source 43. An input device 44 is connected to the display microcomputer 41 for controlling the operation of the display node 40 and/or the sensor node 20. A display 45 is connected to the display microcomputer 41 for presenting an image of the object 10 on the display 45. A wireless display radio 46 is connected to the display microcomputer 41 for receiving the image of the object 10 from the sensor nodes 20. The display node 40 may control the operation of the sensor node 20 by transmitting operating instructions from the wireless display radio 46 to the wireless sensor radio 26.

Referring back to FIG. 1, the sensing node 20 comprises a housing 60 comprising a control panel 62 having a plurality of control buttons 63. A viewing aperture 64 is provided for enabling an operator to visually align the sensing node 20 within the region 12. Preferably, the housing 60 and the control panel 62 with the plurality of control buttons 63 are water resistant and/or shock resistant for operating the sensor node 20 in a hostile environment.

The housing 60 is provided with a lower mounting 65 for mounting the sensor node 20 in a permanent direction and/or orientation. As will be described further in this specification, the housing 60 is provided with an upper mounting 66 located on an upper surface of the housing 60 for mounting a plurality of sensor nodes 20 in a stacked relationship. The housing 60 may be provided with other types of mountings as will be described hereinafter.

Referring back to FIGS. 2A-2C, three examples of the display node 40A-40C are illustrated for use with the sensor node 20 of FIG. 1. The display nodes 40A-40C of FIGS. 2A-2C communicate with the sensor node 20 of FIG. 1 through wireless display radios 46A-46C as indicated by the arrows 16A-16C. The display nodes 40A-40C of FIGS. 2A-2C may be a terminal in an office, a personal computer, a laptop computer, a handheld computer, a cellular telephone or the like.

FIG. 2A illustrates the display node 40A as a personal computer or a terminal. The sensor node 20 shown in FIG. 1 is connected to the world wide web (WWW) by the wireless sensor radio 26 as symbolized by the arrow 16. In this example, the display node 40A is connected to the world wide web (WWW) by the telephone lines 18A. The world wide web (WWW) is connected to the wireless sensor radio 26 as symbolized by the arrow 16A.

FIG. 2B illustrates the display node 40B as a handheld computer or a cellular telephone. The sensor node 20 shown in FIG. 1 is connected to the display node 40B by the wireless sensor radio 26 and the wireless display radio 46B as symbolized by the arrows 16 and 16B.

FIG. 2C illustrates the display node 40C as a laptop or a handheld computer. The sensor node 20 shown in FIG. 1 is connected to the display node 40C by the wireless sensor radio 26 and the wireless display radio 46C as symbolized by the arrows 16 and 16C.

It should be appreciated by those skilled in the art that the wireless connection between the sensor node 20 and the display nodes 40A-40C may comprise high speed electrical and optical communication lines, microwaves, cellular and satellite wireless communications or other types of wireless communication.

Figure 5:
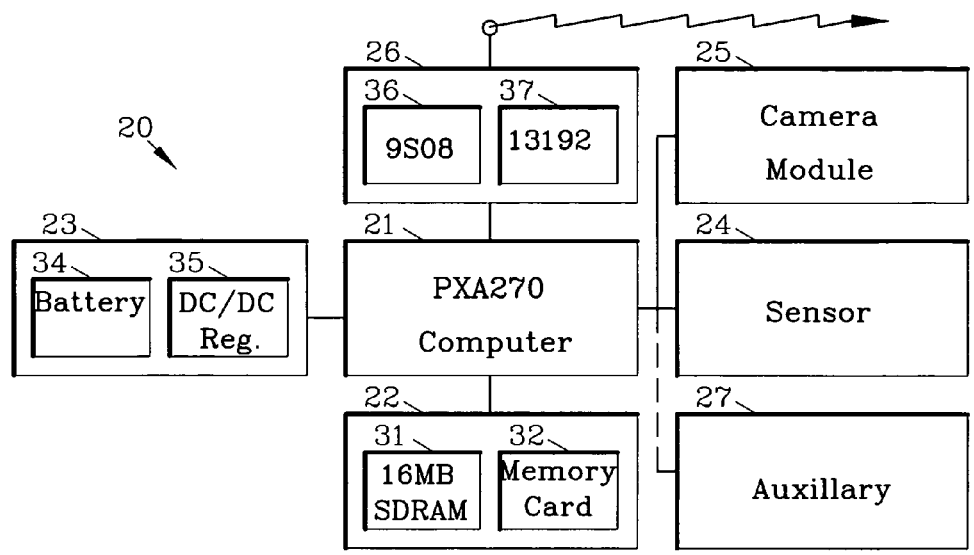
FIG. 5 is a circuit diagram of the sensor node of FIG. 1.

FIG. 5 is a circuit diagram of the sensor node 20 of FIG. 1. In this example, the sensor microcomputer 21 is shown as a PXA270 manufactured by the Intel Corporation. The sensor microcomputer 21 is connected to the memory 22 comprising a 16 MB SDRAM memory 31 for storing software instructions for the sensor node 20. The sensor microcomputer 21 is connected to a memory card 32 for storing images recorded by the camera 25. Preferably, the memory card 32 is removable for enabling the stored images on the memory card 32 to be directly transfer to a remote computer (not shown).

The power source 23 is shown as a battery 34 and a DC to DC converter 35. The DC to DC converter 35 converts the battery voltage into the appropriate voltage for the sensor microcomputer 21. Preferably, the DC to DC converter 35 includes a regulator circuit for controlling the output voltage of the power source 23. Although the power source 23 is shown having a battery 34, it should be understood that the power source 23 may utilize various other voltage sources of such as solar collectors, mechanical generators, fuel cells and the like.

The sensor 24 is connected to the sensor microcomputer 21 for sensing the presence of an object 12 within the field of view of the sensor 24 in the region 12. When the sensor 24 detects the presence of an object 12 within the field of view of the sensor 24, the camera 25 is triggered by the sensor microcomputer 21 to image the object 12. Various types of sensors 24 suitable for use with the sensor node 20 are explained with reference to FIG. 10.

The image the object 12 taken by the camera 25 is processed by the sensor microcomputer 21. The microcomputer 21 stores the image recorded by the camera 25 in the memory card 32. As will be described in greater detail hereafter, various types of cameras 25 are suitable for use with the sensor node 20.

The wireless sensor radio 26 is shown as a limited range radio frequency transceiver. The wireless sensor radio 26 transmits the image of the object 10 to wireless display radio 46 of the display node 40. Various types of wireless display radios 46 suitable for use with the sensor node 20 are explained with reference to FIG. 11.

In this example, the wireless sensor radio 26 is shown having an integrated circuit (9S08) manufactured by Mepco operating as a driver for an integrated circuit (13192) manufactured by Motorola. The integrated circuit (13192) is a transceiver operating as an 802 communicator.

An auxiliary unit 27 is connected to the sensor microcomputer 21 for enhancing the operation of the sensor node 20. Various types of auxiliary units 27 suitable for use with the sensor node 20 are explained with reference to FIG. 13.

Figure 6:
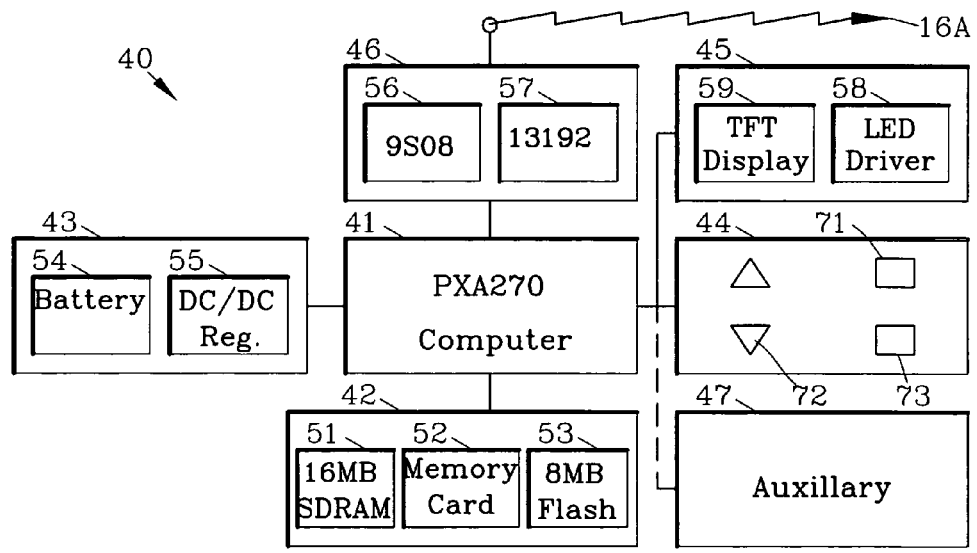
FIG. 6 is a circuit diagram of the display nodes of FIGS. 2A-2C.

FIG. 6 illustrates the display microcomputer 41 comprising a PXA270 manufactured by the Intel Corporation. The display microcomputer 41 is connected to the memory 42 comprising a 16 MB SDRAM memory 51 for storing software instructions for the sensor node 20. The display microcomputer 41 is connected to a memory card 52 for storing images recorded by the camera 45. Preferably, the memory card 52 is removable for enabling the stored images on the memory card 52 to be directed transfer to a remote computer (not shown). The memory 42 comprising a 8 MB flash memory 53 for storing additional software instructions for the display node 40.

The power source 43 is shown as a battery 54 and a DC to DC converter 55. The DC to DC converter 55 converts the battery voltage into the appropriate voltage for the display microcomputer 41. Preferably, the DC to DC converter 55 includes a regulator circuit for controlling the output voltage of the power source 43. Although the power source 43 is shown having a battery 54, it should be understood that the power source 43 may utilize various other voltage sources of such as conventional alternating current (AC), solar collectors, mechanical generators, fuel cells and the like.

The input device 44 is connected to the display microcomputer 41 for controlling the operation of the display node 40 and/or the sensor node 20. In FIGS. 2A and 2C, the input device 44 comprises a keyboard. In FIG. 2B, the input device 44 comprises a limited keypad such as a telephone keypad. In FIG. 6, the input device 44 includes a plurality of button switches 71-13 for controlling the movement of a cursor on the display 45. In still a further alternative, the input device 44 comprises a touch screen display 45 for selecting icons on the display 45.

The display 45 is connected to the display microcomputer 41 for viewing the image recorded by the sensor node 20. In addition, the display 45 is connected to the display microcomputer 41 for controlling the operation of the display node 40 and the sensor node 20.

In FIG. 2A, the display 45 comprises a conventional computer monitor. In FIG. 2B, the display 45 comprises a cellular telephone screen or a screen of a handheld computer. In FIG. 2C, the display 45 comprises a screen of a portable computer. The display 45 in FIG. 6 is shown comprising a LED driver 58 for operating a display screen 59 shown as a TFT display screen. It should be appreciated by those skilled in the art that various types of display, display screens may be used with the present invention.

The wireless display radio 46 is shown as a limited range radio frequency transceiver. The wireless display radio 46 receives the image of the object 10 from the wireless sensor radio 26 of the sensor node 20. Various types of wireless display radios 46 suitable for use with the display node 20 are explained with reference to FIG. 12.

In this example, the wireless display radio 46 is shown having an integrated circuit (9S08) manufactured by Mepco operating as a driver for an integrated circuit (13192) manufactured by Motorola. The integrated circuit (13192) is a transceiver operating as an 802 communicator.

An auxiliary unit 47 is connected to the display microcomputer 41 for enhancing the operation of the display node 40. Various types of auxiliary units 47 suitable for use with the display node 40 are explained with reference to FIG. 14.

Figure 7:
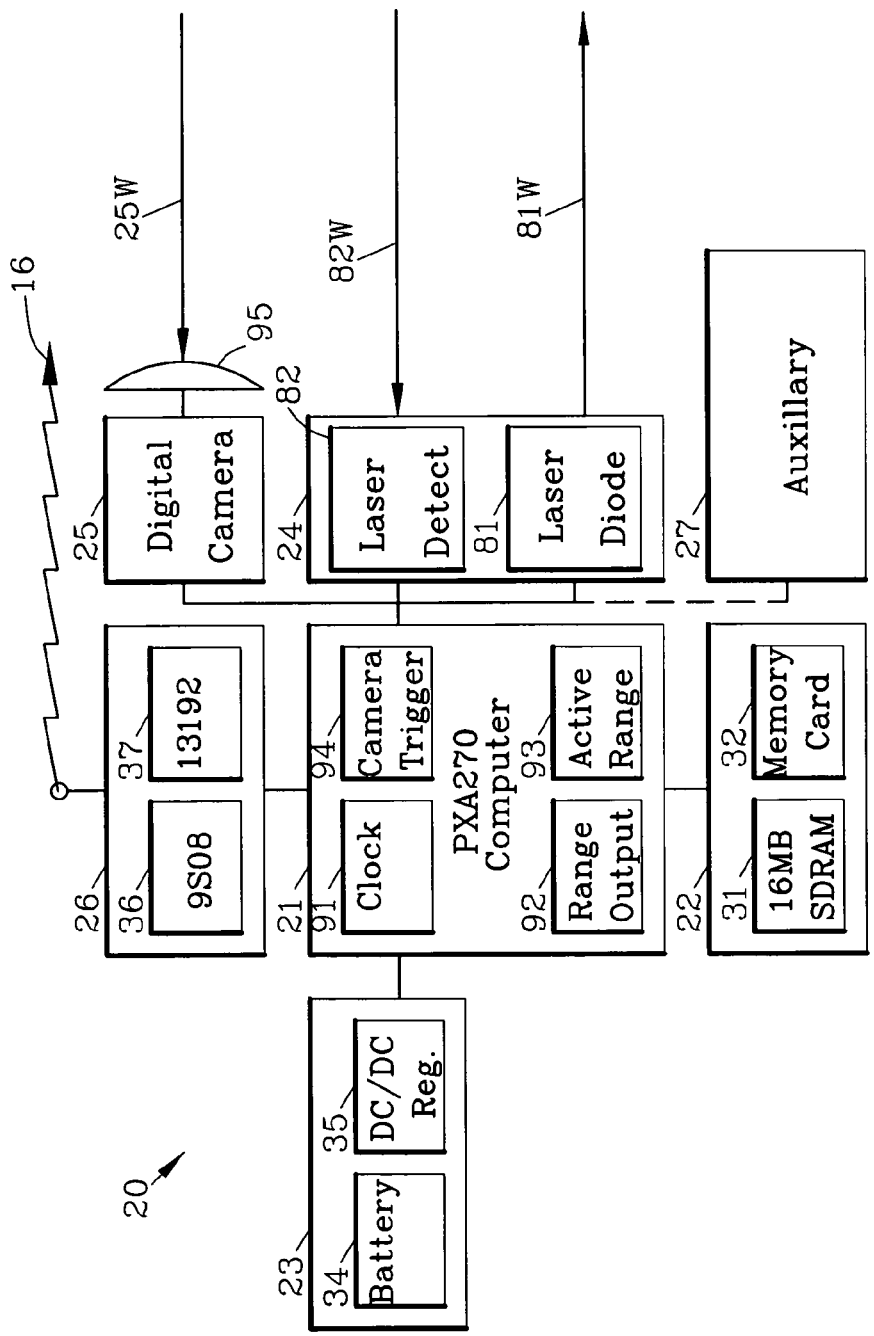
FIG. 7 is a block diagram showing in greater detail the sensor node 20 of FIG. 5.

FIG. 7 is a block diagram showing in greater the sensor node 20 of FIG. 5. The sensor 24 is shown comprising a laser diode 81 and a detector 82. The laser diode 81 emits a laser waveform 81W into the region 12. In this example, the laser waveform 81W is a coherent pulsed laser waveform 81W extending in one dimension.

Figure 10:
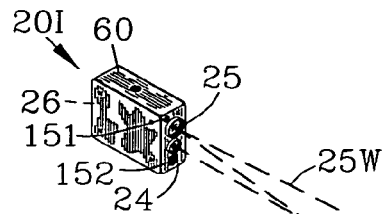
FIG. 10 illustrates the laser beam emanating from the sensor node of FIG. 7.

FIG. 10 illustrates the laser diode 81 of FIG. 7 emitting a single coherent pulsed laser waveform 81W in one dimension within a line 97 as shown in FIG. 10. The pulsed laser waveforms 81W is directed into the region 12 for sensing the presence of the object 10. Upon the pulsed waveforms 81W impinging upon the object 10, a portion of the pulsed laser waveforms 81W is reflected back to the detector 82 as a reflected pulsed laser waveforms 82W. The reception of the reflected pulsed laser waveforms 82W by the detector 82 senses the presence of the object 10 in the region 12. Upon sensing the presence of the object 10 in the region 12, the detector 82 provides an output signal to the microcomputer 21.

Referring back to FIG. 7, the microcomputer 21 comprises a clock 91 for providing a timing cycle for the operation of the microcomputer 21. The microcomputer 21 includes a range detector 92 for determining the range of the object 10 within the region 12. The range detector 92 determines the range of the object 10 by timing the duration between the emission of the pulsed laser waveforms 81W from the laser diode 81 and the reception of the reflected pulsed laser waveforms 82W by the detector 82. The time duration between the emission and the reception of the pulsed laser waveforms 81W and 82W provides a distance of the object 10 from the sensor node 20. The range of the object 10 may be transmitted with the transmission of the image of the object 10 from the sensor node 20 to the display node 40.

Preferably, the range detector 92 provides an output to an active range detector 93 for determining if the object 10 is located within a desired range from the sensor node 20. The active range detector 93 provides an output to a camera trigger 94 only when the range of the object 10 falls within the desired range from the sensor node 20. If the range of the object 10 falls outside of the desired range from the sensor node 20, the active range detector 93 does not provide an output to the camera trigger 94. A further explanation of the operation of the active range detector 93 will be described with reference to FIG. 33. In the alternative, the range detector 92 may provide an output directly to the camera trigger 94.

The camera 25 is aligned with the laser diode 81 for imaging the object 10 intercepting the laser waveforms 81W. The camera 25 may be provided with a lens 95 for magnified the image of the object 10 for the camera 25. The camera 25 is an electronic camera for creating an electronic image of the object 10. Various types of image receptors may be used in the camera 25 such as a charge couple device (CCD) or any other suitable electronic camera and the like.

When the camera trigger 94 actuates the camera 25, the camera 25 transmits a digital image of the object 10 to the microcomputer 21. The microcomputer 21 processes the digital image from the camera 25 and stores the digital image in the memory card 32. The digital image is stored in the memory card 32 for subsequent transfer to the display node 40.

The digital image in the memory card 32 is transferred from the memory card 32 through the wireless sensor radio 26 to the wireless display radio 46. The wireless sensor radio 26 comprises a driver circuit 36 providing an input to a transceiver circuit 37. In this example, the driver circuit 36 is shown as an integrated circuit (9S08) whereas the transceiver circuit 37 is shown as an integrated circuit (13192).

The digital image is transferred from the wireless sensor radio 26 to the wireless display radio 46. The digital image may be transferred from the sensor node 20 to the display node 40 upon a signal transmitted from the display node 40. In the alternative, the digital image may be periodically transferred from the sensor node 20 to the display node 40.

Figure 8:
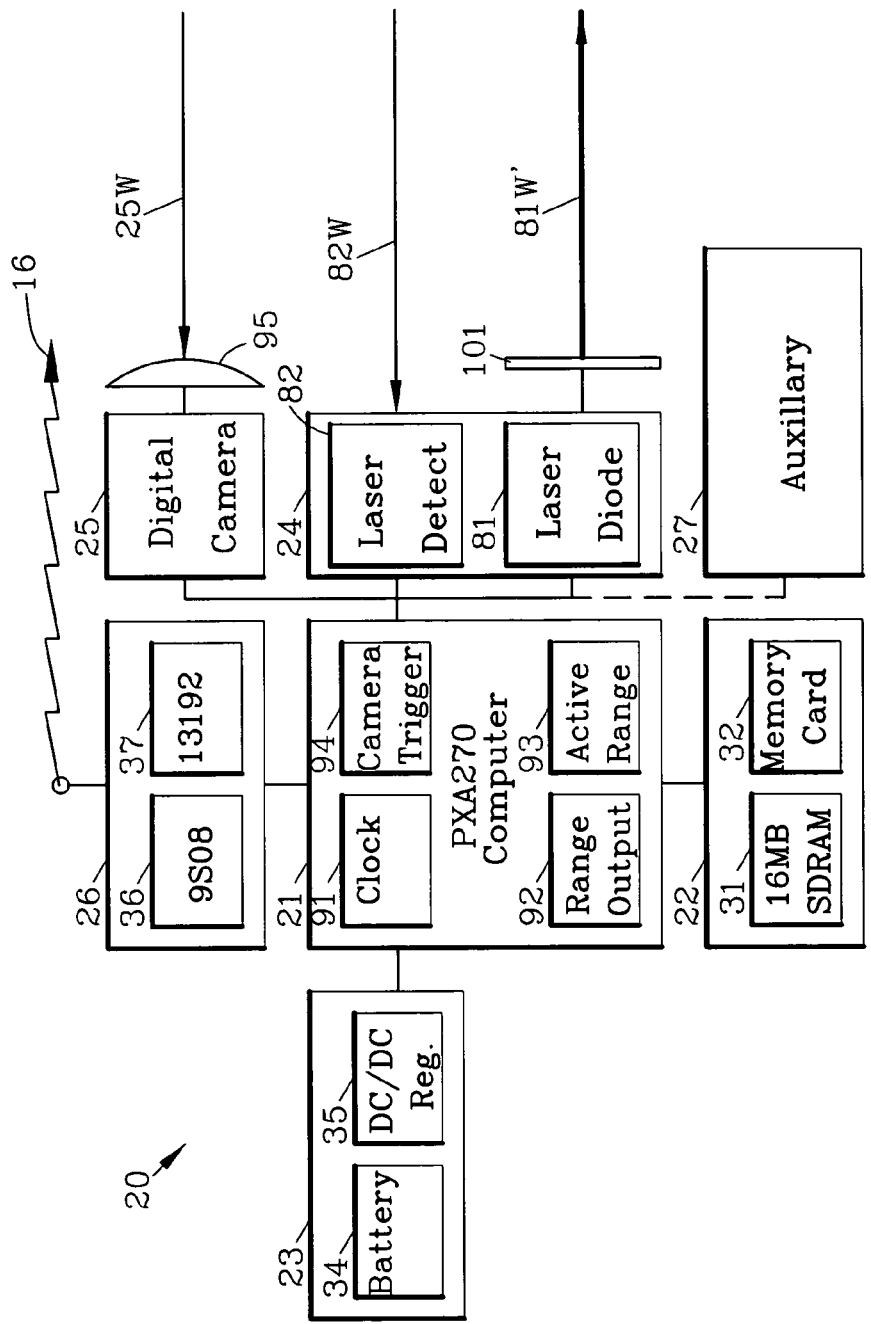
FIG. 8 is a block diagram illustrating a first variation of FIG. 7.

FIG. 8 is a block diagram similar to FIG. 7 illustrating a first variation in the laser diode 81. In this embodiment a lenticular lens 101 is interposed in the laser beam to create a laser waveform 81W' extending in two dimensions. The lenticular lens 101 comprises an array of semi-cylindrical lens arrange in an adjacent parallel relationship. The structure of a lenticular lens should be well known to those skilled in the optical art.

Figure 11:
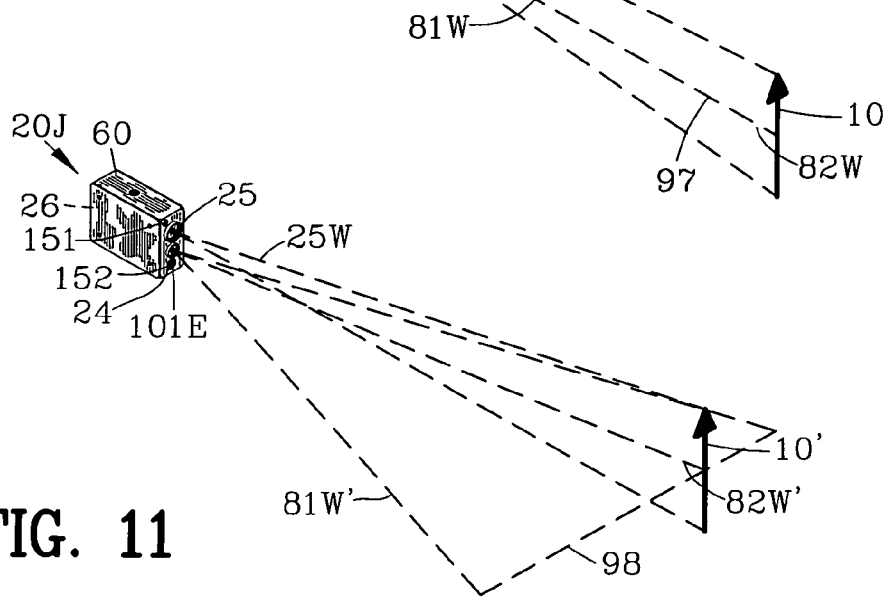
FIG. 11 illustrates the laser beam emanating from the sensor node of FIG. 8.

FIG. 11 illustrates the laser diode 81 of FIG. 8 projecting a pulsed laser waveform 81W' in two dimensions within a plane 98. Upon the pulsed waveforms 81W' impinging upon the object 10', a portion of the pulsed laser waveforms 81W' is reflected back to the detector 82 of the sensor 24 as a reflected pulsed laser waveforms 82W'. The reception of the reflected pulsed laser waveforms 82W' by the detector 82 of the sensor 24 senses the presence of the object 10 in the region 12. Upon sensing the presence of the object 10 in the region 12, the detector 82 provides an output signal to the microcomputer 21.

Referring back to FIG. 9, the camera trigger 94 actuates the camera 25 to transmit a digital image of the object 10' to the microcomputer 21. The microcomputer 21 processes the digital image from the camera 25 and stores the digital image in the memory card 32. The digital image is stored in the memory card 32 for subsequent transfer to the display node 40.

Figure 9:
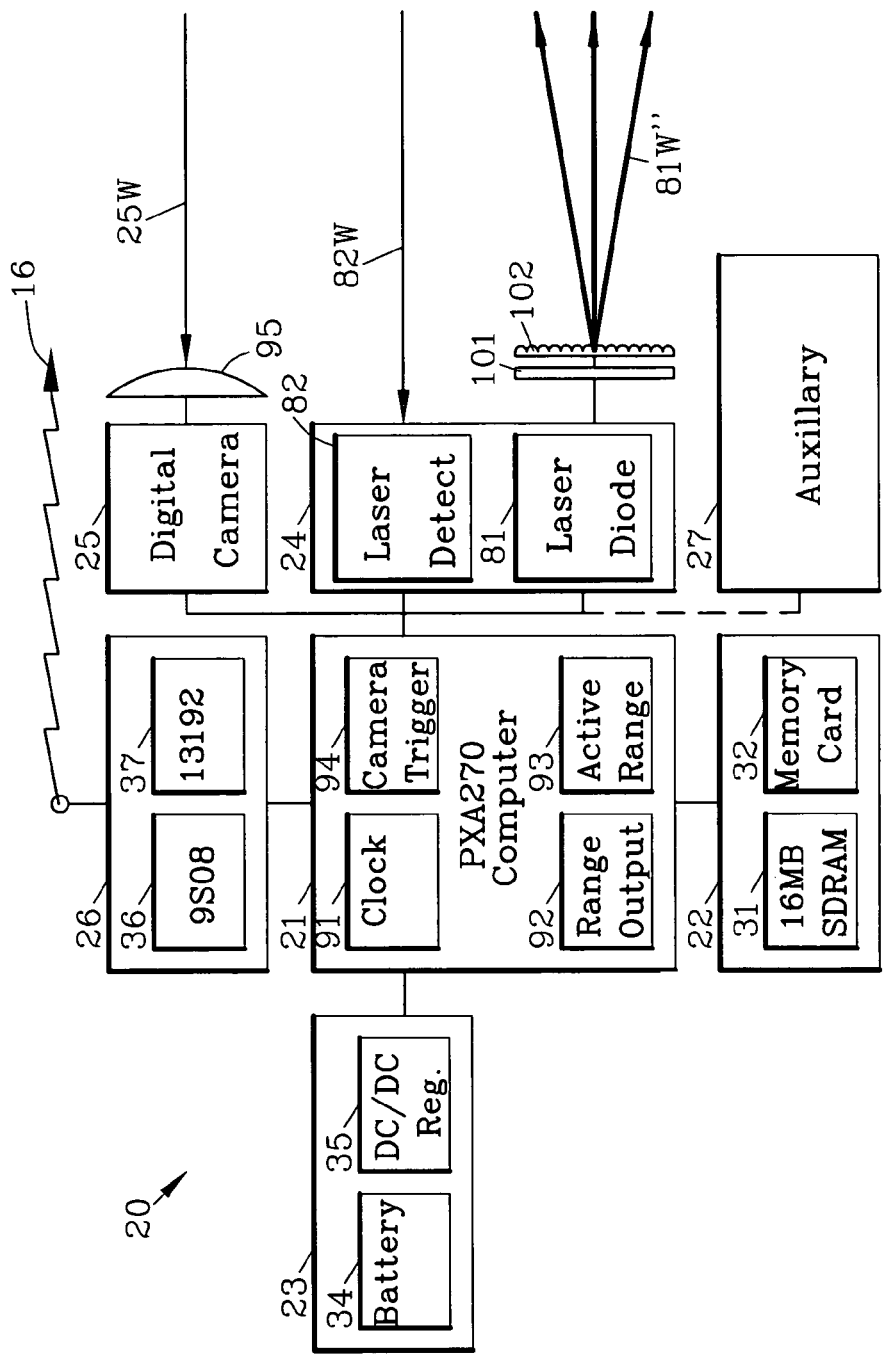
FIG. 9 is a block diagram illustrating a second variation of FIG. 7.

FIG. 9 is a block diagram similar to FIG. 8 illustrating a second variation in the laser diode 81. In this embodiment plural lenticular lenses 101 and 102 are interposed in the laser beam to create a laser waveform 81W'' extending in three dimensions. Each of the lenticular lenses 101 and 102 comprises an array of semi-cylindrical lens arrange in an adjacent parallel relationship as should be well known to those skilled in the optical art.

Figure 12:
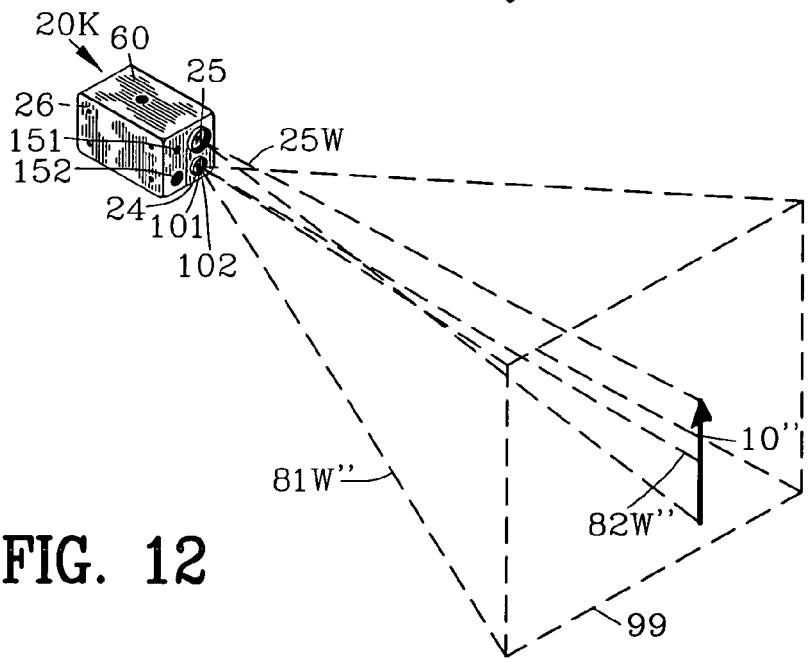
FIG. 12 illustrates the laser beam emanating from the sensor node of FIG. 9.

FIG. 12 illustrates the laser diode 81 of FIG. 9 projecting a pulsed laser waveform 81W'' in three dimensions within a volume 99. Upon the pulsed waveforms 81W'' impinging upon the object 10'', a portion of the pulsed laser waveforms 81W'' is reflected back to the detector 82 of the sensor 24 as a reflected pulsed laser waveforms 82W''. The reception of the reflected pulsed laser waveforms 82W'' by the detector 82 of the sensor 24 senses the presence of the object 10'' in the region 12. Upon sensing the presence of the object 10'' in the region 12, the detector 82 provides an output signal to the microcomputer 21.

Referring back to FIG. 9, the camera trigger 94 actuates the camera 25 to transmit a digital image of the object 10'' to the microcomputer 21. The microcomputer 21 processes the digital image from the camera 25 and stores the digital image in the memory card 32. The digital image is stored in the memory card 32 for subsequent transfer to the display node 40.

Figure 13:
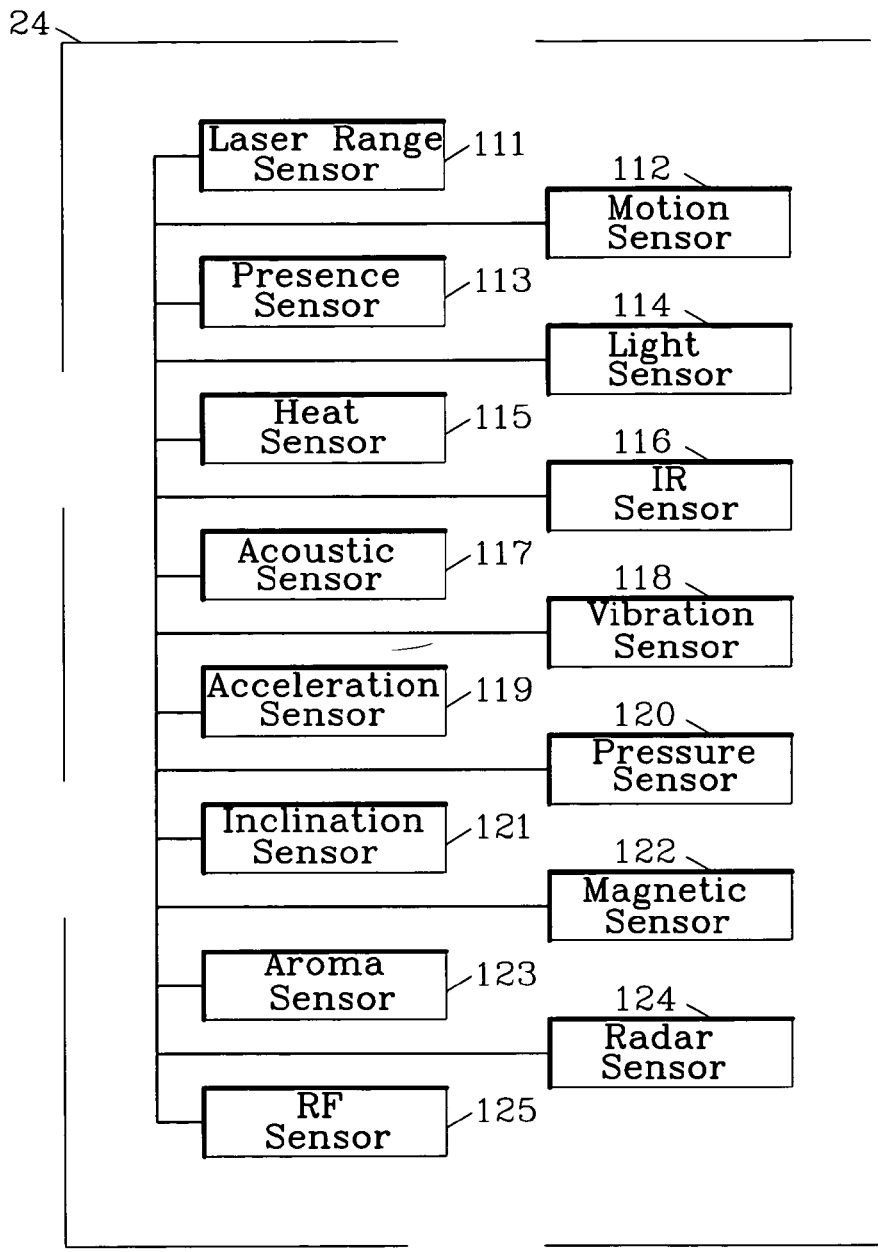
FIG. 13 is a block diagram of various examples of the sensors of the sensor node of FIG. 3.

FIG. 13 is a block diagram showing in greater detail the sensor 24 of FIGS. 1-9. The sensor 24 may include one or more of the various sensors shown in FIG. 13. The sensor may include a range sensor 111 for sensing the range of the object 10 within the region 12. The range sensor 111 senses the distance between the sensor node 20 and the objects 10. The range sensor 111 may utilize the laser diode 81 and detector 82 as shown in FIGS. 7-9. The sensor 24 may incorporate a visual or infrared electromagnetic radiation laser for sensing the distance to the object 10. In the alternative, the range sensor 111 may comprises an ultrasonic range sensor.

The sensor may include a motion sensor 112 for sensing the motion of the object 10 within the region 12. The motion sensor 112 may be configured to be sensitive to specific movements of the objects 10. In the alternative, the motion sensor 112 may be used to sense the movements of sensor node 20.

The sensor may include a presence sensor 113 for sensing the presence of the object 10 within the region 12. The presence sensor 113 may sense the presence of objects 10 in various ways. The presence sensor 113 may sense the visual presence of the object by utilizing the camera 25 for sensing a change in content of the digital image as a function of time. The presence sensor 113 may sense the infrared presence of the object 10 by sensing the infrared emission of the object 10.

The sensor may include a light sensor 114 for sensing the light emission of the object 10 within the region 12. The light sensor 114 may be configured to be sensitive to specific wavelengths of light emission of the object 10 within the region 12. In the alternative, the light sensor 114 may be used to sense the visual electromagnetic radiation emitted by the ambient within the region 12.

The sensor may include a heat sensor 115 for sensing the heat of the object 10 within the region 12. The heat sensor 115 may be configured to be sensitive to specific wavelengths of temperature emission radiated from objects 10. In the alternative, the heat sensor 115 may be used to as an optical pyrometer to sense the temperature of the sensor node and/or the ambient within the region 12. The heat sensor 115 may be used for sensing heat generating objects such as animals and heat producing equipment. The heat sensor 115 may be utilized for monitoring application wherein the sensor node is positioned to monitor an increase in ambient heat such as a geothermal region.

The sensor may include an infrared sensor 116 for sensing the infrared emission of the object 10 within the region 12. The infrared sensor 116 may be configured to be sensitive to specific wavelengths of the infrared emission radiated from objects 10. In the alternative, the infrared sensor 116 may be used to sense the infrared emission of the ambient within the region 12.

The sensor may include an acoustic sensor 117 for sensing the acoustic emission of the object 10 within the region 12. The acoustic sensor 117 may be configured to be sensitive to specific wavelengths of acoustic energy. In the alternative, the acoustic sensor 117 may be used to sense the acoustic emission of the ambient within the region 12.

The sensor may include a vibration sensor 118 for sensing the vibration of the object 10 within the region 12. The vibration sensor 118 may be configured to be sensitive to specific vibration of the object 10. In the alternative, the vibration sensor 118 may be used to sense the vibration of the sensor node 118 and/or the ambient within the region 12.

The sensor may include an acceleration sensor 119 for sensing the acceleration of the object 10 within the region 12. The acceleration sensor 119 may be configured to be sensitive to specific acceleration of the object 10. In the alternative, the acceleration sensor 119 may be used to sense the acceleration of the sensor node 119 and/or the ambient within the region 12.

The sensor may include a pressure sensor 120 for sensing the pressure of the object 10 within the region 12. The pressure sensor 120 may be configured to be sensitive to specific pressure of the object 10. In the alternative, the pressure sensor 120 may be used to sense the pressure on the sensor node 120 and/or the ambient within the region 12.

The sensor may include an inclination sensor 121 for sensing the inclination of the object 10 within the region 12. The inclination sensor 121 may be configured to be sensitive to specific inclination of the object 10. In the alternative, the inclination sensor 121 may be used to sense the inclination on the sensor node 121 and/or the ambient within the region 12.

The sensor may include a magnetic sensor 122 for sensing the magnetic of the object 10 within the region 12. The magnetic sensor 122 may be configured to be sensitive to specific magnetic of the object 10. In the alternative, the magnetic sensor 122 may be used to sense the magnetic on the sensor node 122 and/or the ambient within the region 12.

The sensor may include an aroma sensor 123 for sensing the aroma of the object 10 within the region 12. The aroma sensor 123 may be configured to be sensitive to a specific aroma of the object 10. In the alternative, the aroma sensor 123 may be used to sense the aroma of the ambient within the region 12.

The sensor may include a radar sensor 124 for sensing the radar emission of the object 10 within the region 12. The radar sensor 124 may be configured to be sensitive to a specific radar emission of the object 10. In the alternative, the radar sensor 124 may be used to sense any radar emission within the region 12.

The sensor may include a radio frequency sensor 125 for sensing the radio frequency emission of the object 10 within the region 12. The radio frequency sensor 125 may be configured to be sensitive to a specific radio frequency emission of the object 10. In the alternative, the radio frequency sensor 125 may be used to sense any radio frequency emission within the region 12.

Figure 14:
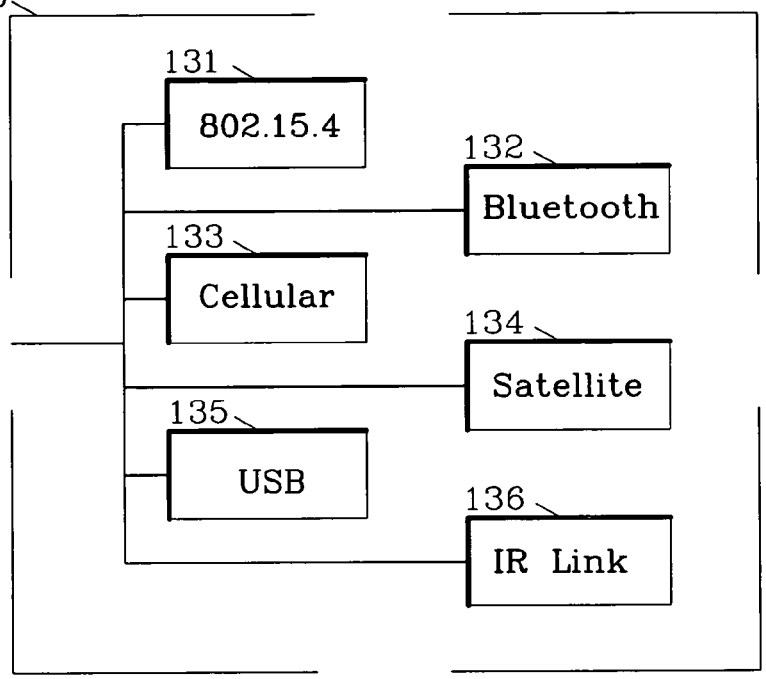
FIG. 14 is a block diagram of various examples of the sensor radios of the sensor node of FIG. 3.
Figure 15:
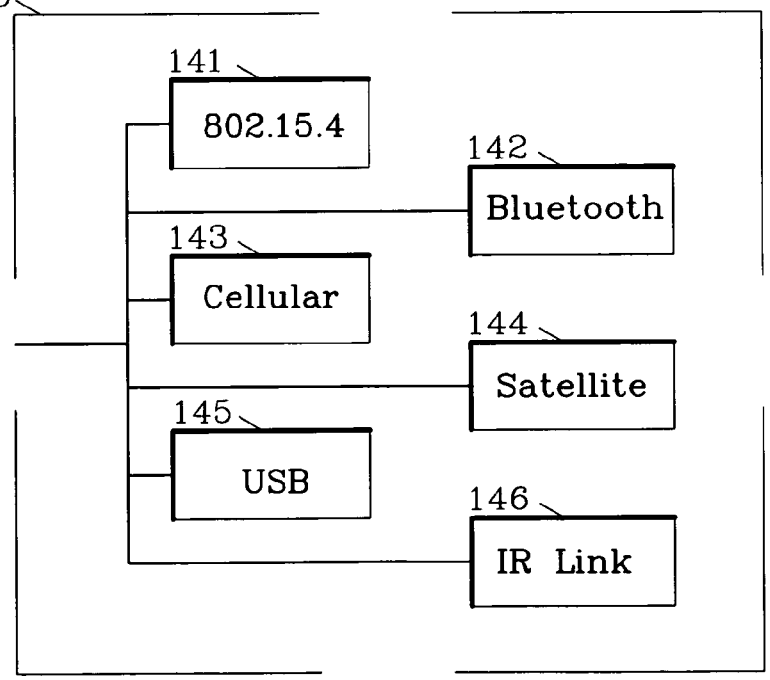
FIG. 15 is a block diagram of various examples of the display radios of the display node of FIG. 4.

FIGS. 14 and 15 are block diagrams showing in greater the sensor node radio 26 and the display node radio 46 of FIGS. 1-9. The sensor node radio 26 and the display node radio 46 may include one or more of the various radios 26 shown in FIGS. 14 and 15. The sensor node radio 26 and the display node radio 46 may include wireless transceivers, wired transceivers and/or infrared transceivers.

The sensor node radio 26 and the display node radio 46 provide communication for sending the image of the object 10 from the sensor node radio 26 to the display node radio 46. The sensor node radio 26 and the display node radio 46 provide communication for sending the instructions from the display node radio 46 to the sensor node radio 26.

FIGS. 14 and 15 illustrate first examples of the sensor node radio 26 and the display node radio 46 shown as radio frequency transceivers 131 and 141. The radio frequency transceivers 131 and 141 operate under a protocol commonly referred to as 802.15.4. The 802.15.4 radio frequency transceivers 131 and 141 enable direct communication between the sensor node 20 and the display node 40 as well as direct communication between the adjacent sensor nodes 20.

FIGS. 14 and 15 illustrate second examples of the sensor node radio 26 and the display node radio 46 shown as radio frequency transceivers 132 and 142. The radio frequency transceivers 132 and 142 operate under a protocol commonly referred to as bluetooth. The bluetooth radio frequency transceivers 132 and 142 enable direct communication between the sensor node 20 and the display node 40 as well as direct communication between the adjacent sensor nodes 20.

FIGS. 14 and 15 illustrate third examples of the sensor node radio 26 and the display node radio 46 shown as radio frequency transceivers 133 and 143. The radio frequency transceivers 133 and 143 operate through a cellular telephone network at one of the designated satellite frequencies. The radio frequency transceiver 143 of the display node radio 46 may be a cellular telephone.

FIGS. 14 and 15 illustrate fourth examples of the sensor node radio 26 and the display node radio 46 shown as radio frequency transceivers 134 and 144. The radio frequency transceivers 134 and 144 operate through a satellite network at one of the designated satellite frequencies.

FIGS. 14 and 15 illustrate fifth examples of the sensor node radio 26 and the display node radio 46 shown as transceivers 135 and 145. The transceivers 135 and 145 operate through a universal serial bus (USB) protocol. The universal serial bus (USB) transceivers 135 and 145 enable a wired communication between the sensor node 20 and the display node 40

FIGS. 14 and 15 illustrate sixth examples of the sensor node radio 26 and the display node radio 46 shown as radio frequency transceivers 136 and 146. The radio frequency transceivers 135 and 145 operate through an infrared link. The infrared link transceivers 135 and 145 enable direct line of sight communication between the sensor node 20 and the display node 40

Figure 16:
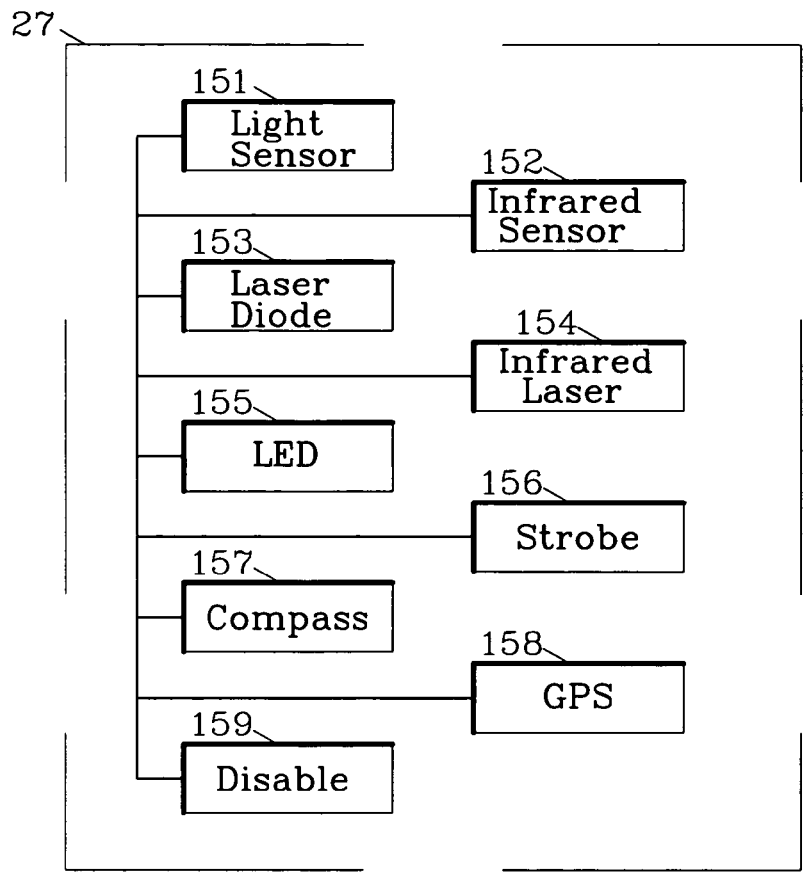
FIG. 16 is a block diagram of various examples of the auxiliary units of the sensor node of FIG. 3.

FIG. 16 is a block diagram showing in greater detail the auxiliary 27 of the sensor node 20 of FIGS. 1-9. The auxiliary 27 of the sensor node 20 may include one or more of the various auxiliary 27 components in FIG. 16.

The auxiliary 27 of the sensor node 20 may include a light sensor 151 for sensing the illumination on the object 10 within the region 12. The sensing the illumination on the object 10 enables the camera 25 to properly image the object 10. In the alternative, the light sensor 151 may be used to sense the level of the illumination of the ambient within the region 12.

The auxiliary 27 of the sensor node 20 may include an infrared sensor 152 for sensing the infrared emission of the object 10 within the region 12. The sensing the infrared emission of the object 10 enables the camera 25 to properly image the object 10. In the alternative, the infrared sensor 152 may be used to sense the level of the infrared emission of the ambient within the region 12.

The auxiliary 27 of the sensor node 20 may include a laser diode 153 for illuminating on the object 10 within the region 12. Preferably, the laser diode 153 is utilized in conjunction with the light sensor 151. When the light sensor 151 senses insufficient illumination on the object 10, the microcomputer 21 actuates the laser diode 153 adding illumination to the object 10 to enable the camera 25 to properly image the object 10. The illumination by the laser diode 153 will be explained further with reference with FIG. 19.

The auxiliary 27 of the sensor node 20 may include a light emitting diode 155 for illuminating on the object 10 within the region 12. Preferably, the light emitting diode 155 is utilized in conjunction with the light sensor 151. When the light sensor 151 senses insufficient illumination on the object 10, the microcomputer 21 actuates the light emitting diode 155 for illuminating the object 10 to enable the camera 25 to properly image the object 10. The illumination by the light emitting diode 155 will be explained further with reference with FIG. 23.

The auxiliary 27 of the sensor node 20 may include a strobe light 156 for illuminating on the object 10 within the region 12. Preferably, the strobe light 156 is utilized in conjunction with the light sensor 151. When the strobe light 156 senses insufficient illumination on the object 10, the microcomputer 21 actuates the strobe light 156 adding illumination to the object 10 to enable the camera 25 to properly image the object 10.

The auxiliary 27 of the sensor node 20 may include a compass 157 for determining the direction of the sensor 24 within the region 12. Preferably, the compass 157 is an electronic compass such as a flux gate magnetometer for indicating the direction of the sensor 24. The compass direction of the sensor 24 may be transmitted by the sensor node radio 26 to the display node radio 46.

The auxiliary 27 of the sensor node 20 may include a global positioning receiver 158 for determining the position of the sensor node 20 within the region 12. The position determined by the global positioning receiver 158 may be transmitted by the sensor node radio 26 to the display node radio 46.

The auxiliary 27 of the sensor node 20 may include a disable circuit 159 for disabling the sensor node 20 within the region 12. One of the purposes of the disable circuit 159 is to disable the sensor node 20 in the event of unauthorized removal of the sensor node 20 from the region 12. The disable circuit 159 may be actuated under a number of conditions. In one example, a movement of the sensor node 20 actuates the disable circuit 159. Each of the inclination sensor 119, the magnetic sensor 122 as well as the compass 157 and the GPS 158 may be used to determine the movement of the sensor node 20. The disabling of the sensor node 20 may be transmitted by the sensor node radio 26 to the display node radio 46.

Figure 17:
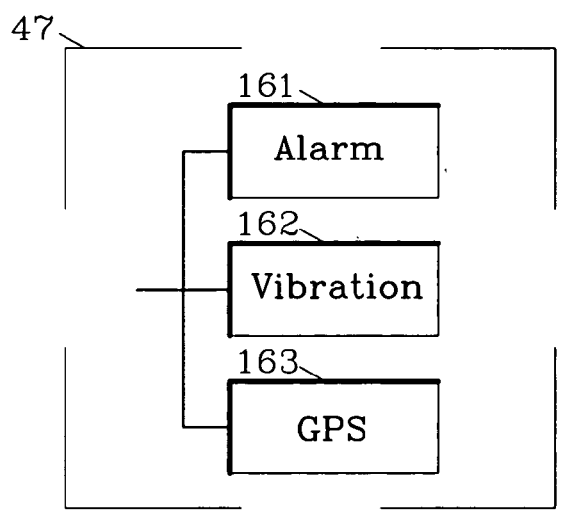
FIG. 17 is a block diagram of various examples of the auxiliary units of the display node of FIG. 4.

FIG. 17 is a block diagram showing in greater the auxiliary 47 of the display node 40 of FIGS. 1-6. The auxiliary 47 of the display node 40 may include one or more of the various auxiliary 47 components in FIG. 17.

The auxiliary 47 of the display node 40 may include an alarm 161 for signaling a reception of a transmission from the sensor node 20. The alarm 161 may be an audible alarm, a visual alarm or the vibration alarm 162 shown in FIG. 17.

The auxiliary 47 of the display node 40 may include a global positioning receiver 163 for determining the position of the display node 40. The position of the display node 40 in combination with the position of the sensor node 20 transmitted from the sensor node 20 enables the microcomputer 21 to determine the distance and bearing of the sensor node 20 from the display node 40.

Figure 18:
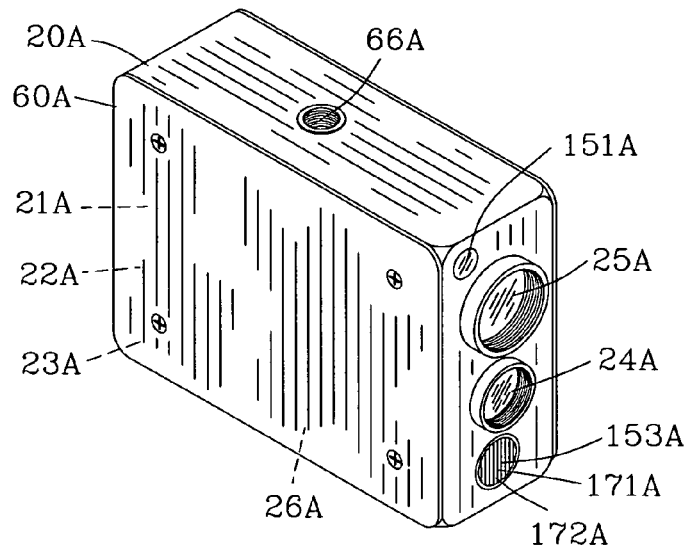
FIG. 18 is an isometric view of a first example of the sensor node of FIG. 1.
Figure 19:
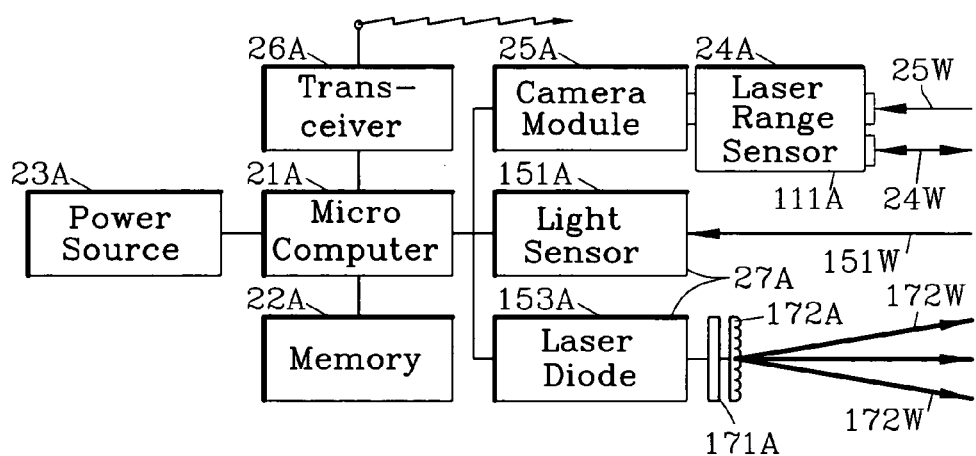
FIG. 19 is a block diagram of the sensor node of FIG. 18.

FIGS. 18 and 19 illustrate a first example of the sensor node 20A of FIG. 1. Similar parts of are labeled with similar numerical characters as FIGS. 1-9 with the addition of an alphabetical character. In this example, the sensor 24A includes a laser range finder 111A utilizing waveform 24W for sensing the presence and the range of the object 10. The camera 25A is optically coupled to the sensor 24A for receiving a waveform 25A to image the object 10.

A light sensor 151A senses the illumination 151W from the object 10. A laser diode 153A includes plural lenticular lenses 171A and 172A for creating laser waveforms 171W and 172W extending in three dimensions. When the light sensor 151A senses insufficient illumination on the object 10, the microcomputer 21 actuates the laser diode 153A for illuminating the object 10 through the plural lenticular lenses 171A and 172A. The illumination of the object 10 by the laser diode 153A enables the camera 25A to properly image the object 10.

Figure 20:
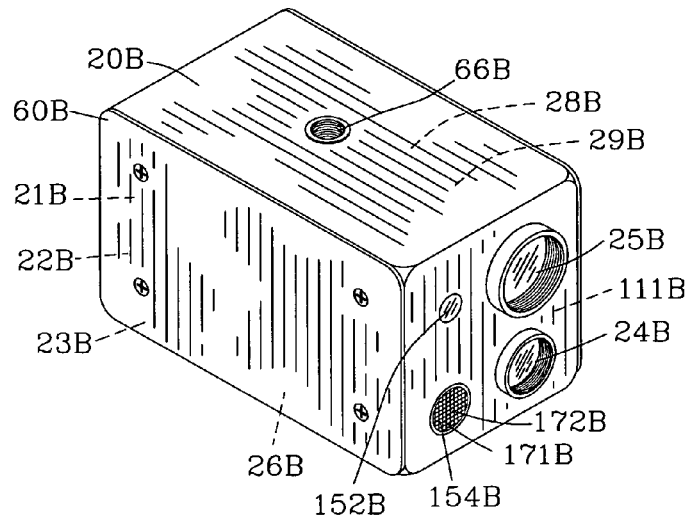
FIG. 20 is an isometric view of a second example of the sensor node of FIG. 1.
Figure 21:
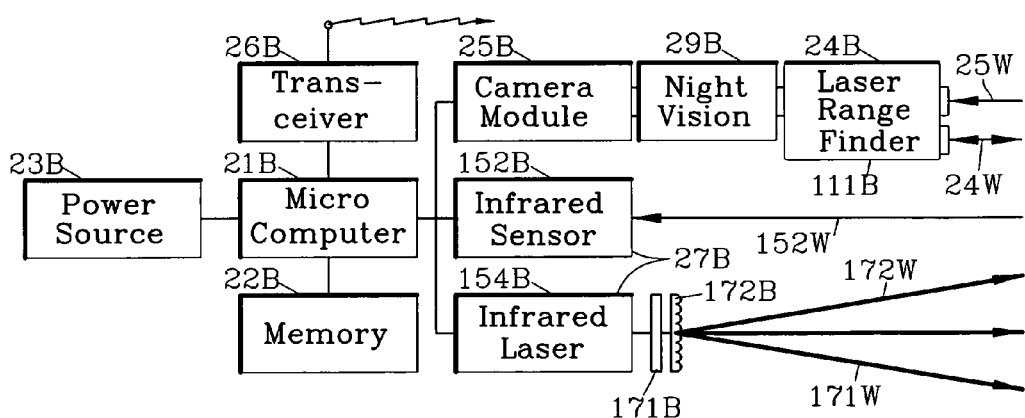
FIG. 21 is a block diagram of the sensor node of FIG. 20.

FIGS. 20 and 21 illustrate a second example of the sensor node 20B of FIG. 1. Similar parts of are labeled with similar numerical characters as FIGS. 1-9 with the addition of an alphabetical character.

In this example, the sensor 24B includes a laser range finder 111B utilizing waveform 24W for sensing the presence and the range of the object 10. A night vision optical amplifier 29B is located before the camera 25B. The camera 25B is optically coupled to the night vision optical amplifier 29B for receiving an amplified waveform 25W to image the object 10.

An optional infrared sensor 152B may be provided for sensing the infrared emission 151W from the object 10. An infrared laser 154B includes plural lenticular lenses 171B and 172B for creating infrared laser waveforms 171W and 172W extending in three dimensions. When the infrared sensor 152B senses insufficient infrared emission from the object 10, the microcomputer 21 actuates the infrared laser 154B for illuminating the object 10 through the plural lenticular lenses 171B and 172B. The illumination of the object 10 by the infrared laser 154B enables the camera 25B to properly image the object 10.

Figure 22:
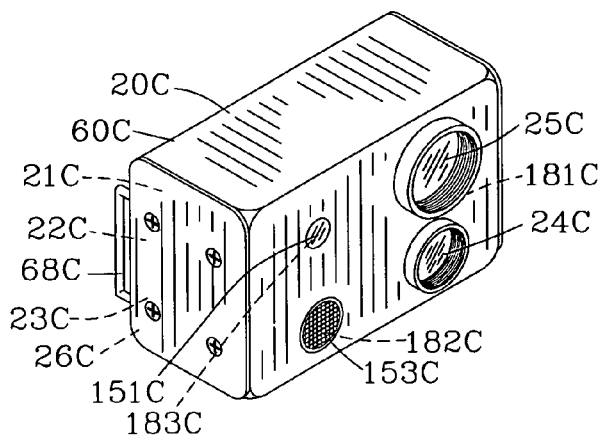
FIG. 22 is an isometric view of a third example of the sensor node of FIG. 1.
Figure 23:
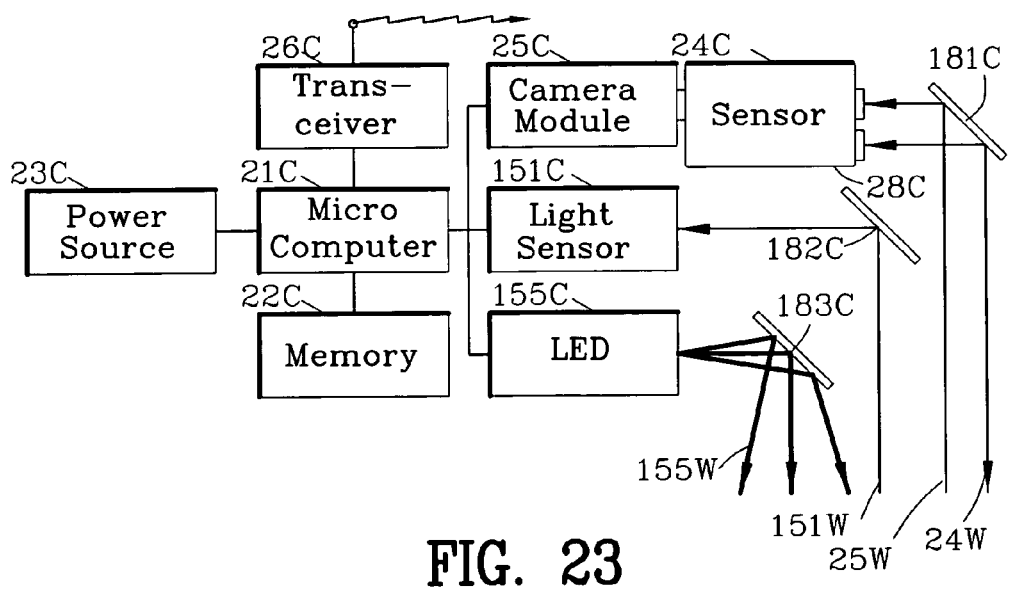
FIG. 23 is a block diagram of the sensor node of FIG. 22.

FIGS. 22 and 23 illustrate a third example of the sensor node 20C of FIG. 1. Similar parts of are labeled with similar numerical characters as FIGS. 1-9 with the addition of an alphabetical character. In this example, the sensor 24C utilizes waveform 24W for sensing the presence of the object 10. The camera 25C is optically coupled to the sensor 24C for receiving a waveform 25W to image the object 10. A mirror 181C is provided for diverting the waveforms 24W and 25W through an angle of ninety degrees (90°).

A light sensor 151C senses the illumination 151W from the object 10. A mirror 182C is provided for diverting the waveform 151W through an angle of ninety degrees (90°). A light emitting diode 155C creates a waveform 155W extending in three dimensions. A mirror 183C is provided for diverting the waveform 155W through an angle of ninety degrees (90°). When the light sensor 151C senses insufficient illumination on the object 10, the microcomputer 21 actuates the light emitting diode 155C for illuminating the object 10 to enable the camera 25C to properly image the object 10.

The mirrors 181C-183C divert the waveforms 24W, 25W, 151W and 155W through an angle of ninety degrees (90°) for reducing the depth of the sensor node 20C. The sensor node 20C may be provided with a mounting 68C for securing the sensor node 20C to an upstanding member by a such as a tree and the like. A further example of the mounting of the sensor node 20C to a tree will be described with reference to FIG. 33.

Figure 24:
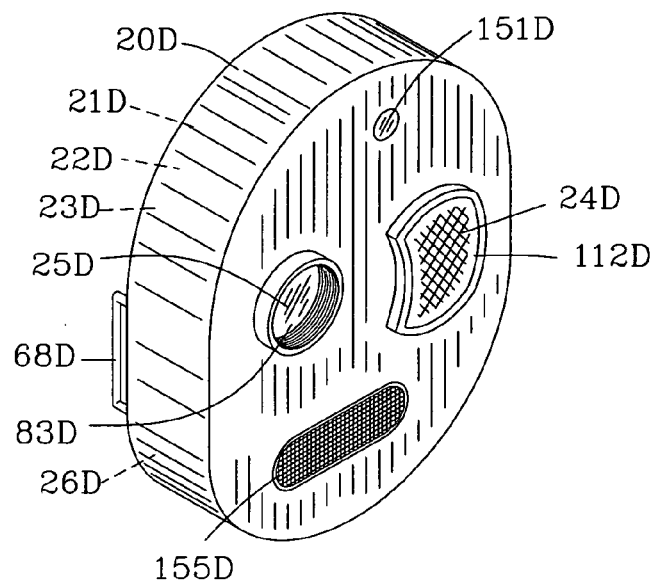
FIG. 24 is an isometric view of a fourth example of the sensor node of FIG. 1.
Figure 25:
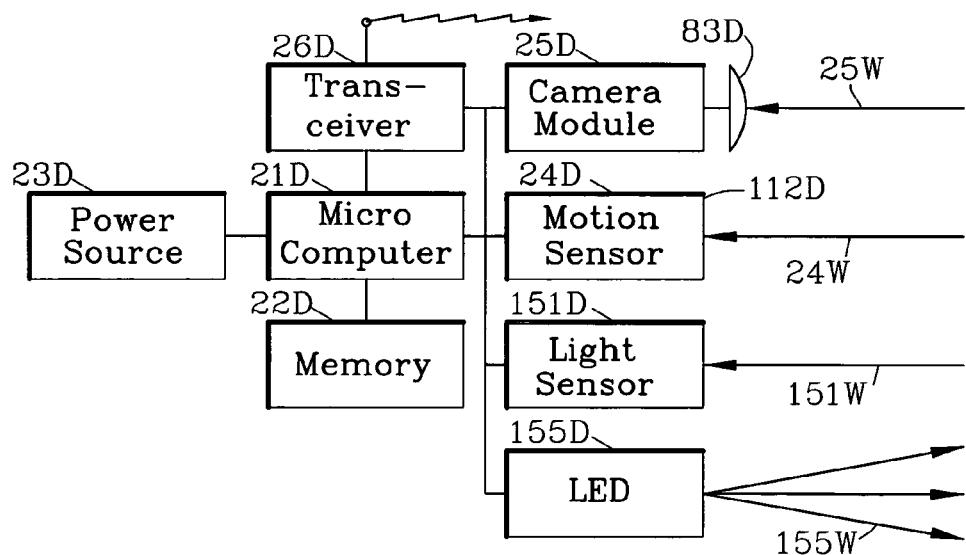
FIG. 25 is a block diagram of the sensor node of FIG. 24.

FIGS. 24 and 25 illustrate a fourth example of the sensor node 20D of FIG. 1. Similar parts of are labeled with similar numerical characters as FIGS. 1-9 with the addition of an alphabetical character. In this example, the sensor 24D is shown as a motion sensor 112D for sensing the motion of the object 10 through waveform 24W. The camera 25D includes a lens 83D for receiving a magnified waveform 25W of the object 10.

A light sensor 151D senses the illumination 151W from the object 10. A light emitting diode 155D creates a waveform 155W extending in three dimensions. When the light sensor 151D senses insufficient illumination on the object 10, the microcomputer 21 actuates the light emitting diode 155D for illuminating the object 10 to enable the camera 25D to properly image the object 10. The sensor node 20D is provide with a mounting 68D for securing the sensor node 20D to an upstanding member as will be described with reference to FIG. 33.

Figure 26:
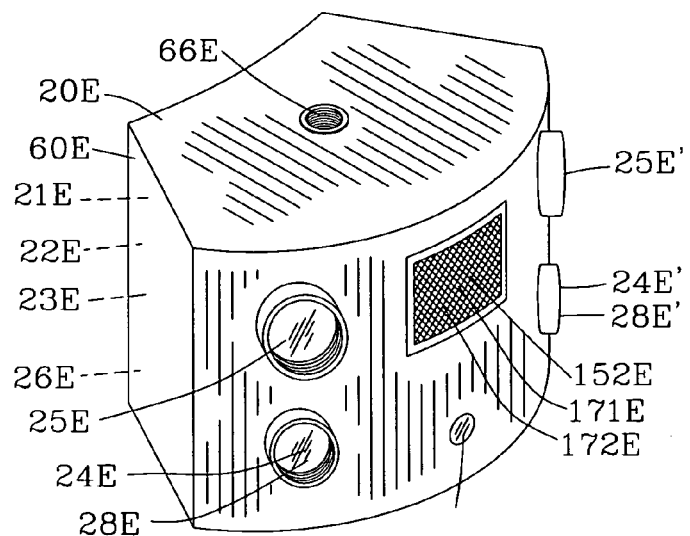
FIG. 26 is an isometric view of a fifth example of the sensor node of FIG. 1.
Figure 27:
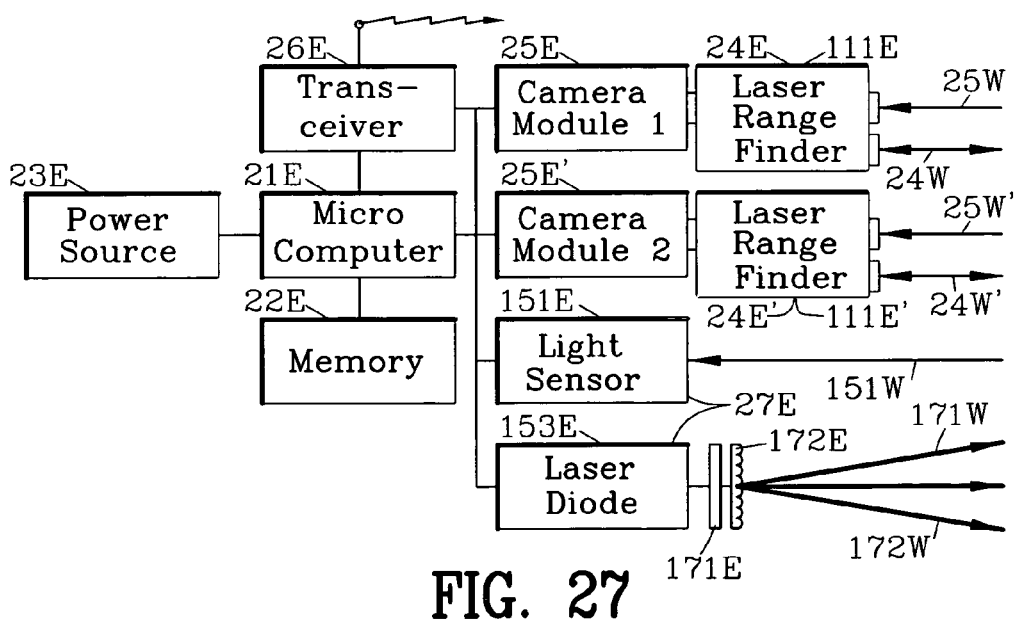
FIG. 27 is a block diagram of the sensor node of FIG. 26.

FIGS. 26 and 27 illustrate a fifth example of the sensor node 20E of FIG. 1. Similar parts of are labeled with similar numerical characters as FIGS. 1-9 with the addition of an alphabetical character. In this example, the sensor 24E includes a first and a second laser range finder 111E and 111E' utilizing waveforms 24W and 24W' for sensing the presence and the range of the object 10.

A first and a second camera 25E and 25E' are optically coupled to the first and second laser range finders 111E and 111E' for receiving waveform 25W and 25W' from the object, respectively. The first and second laser range finders 111E and 111E' and the first and second camera 25E and 25E' may be disposed in either a parallel or an angular relationship for providing a stereoscopic view of the object 10. The stereoscopic first and second laser range finder 111E and 111E' enable the microcomputer 21 to calculate the range, the speed and the direction of the object 10 through the region 12. A light sensor 151E and the laser diode 153E illuminate the object 10 to enable the stereoscopic first and second camera 25E and 25E' to image the object 10.

Figure 29:
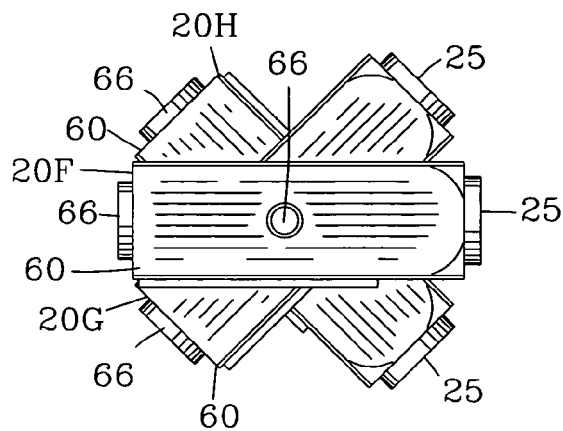
FIG. 29 is a top view of FIG. 28.
Figure 28:
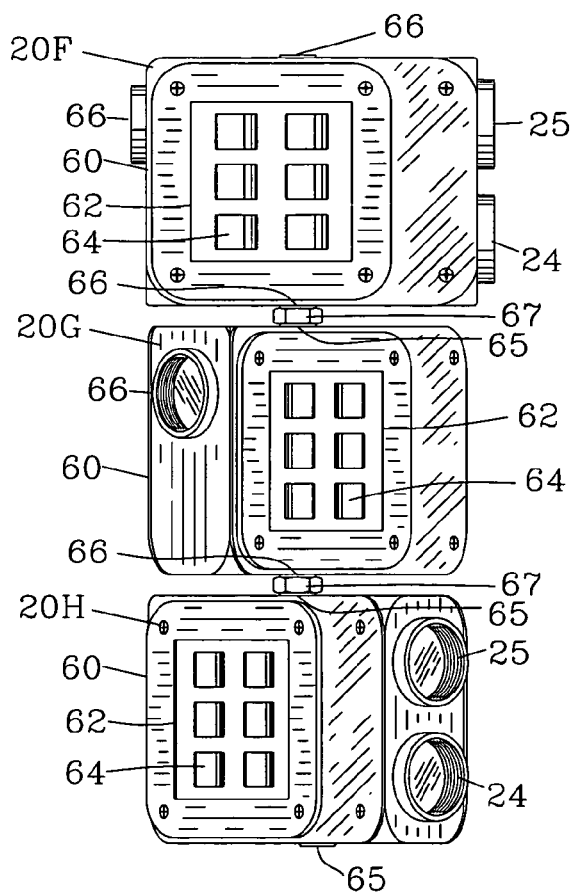
FIG. 28 is a side view of a plurality of sensor nodes arranged in a stacked relationship.

FIGS. 28 and 29 are side and top views of a plurality of sensor nodes 20F-20H arranged in a stacked relationship. The lower mounting 65 and the upper mounting 66 enable coupling 67 to interconnect the plurality of sensor nodes 20F-20H in a stacked relationship. Preferably, the lower and upper mountings 65 and 66 are threaded aperture in a manner similar to standard tripod mountings.

Figure 30:
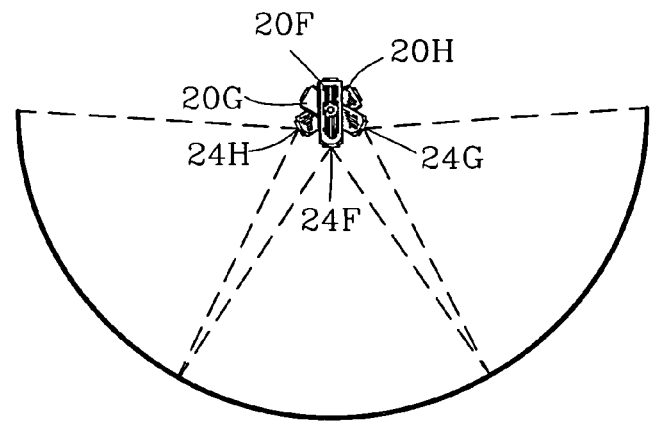
FIG. 30 is a plan view of the plurality of sensor nodes of FIGS. 28 and 29.

FIG. 30 is a plan view of a plurality of sensor nodes 20F-20H of FIGS. 28 and 29. The lower and upper mountings 65 and 66 and the coupling 67 enable the plurality of sensor nodes 20F-20H to be arranged at various angles relative to one another. In this example, the plurality of sensor nodes 20F-20H are arranged to cover one hundred and eighty degrees (180°) of the region 12.

Figure 31:
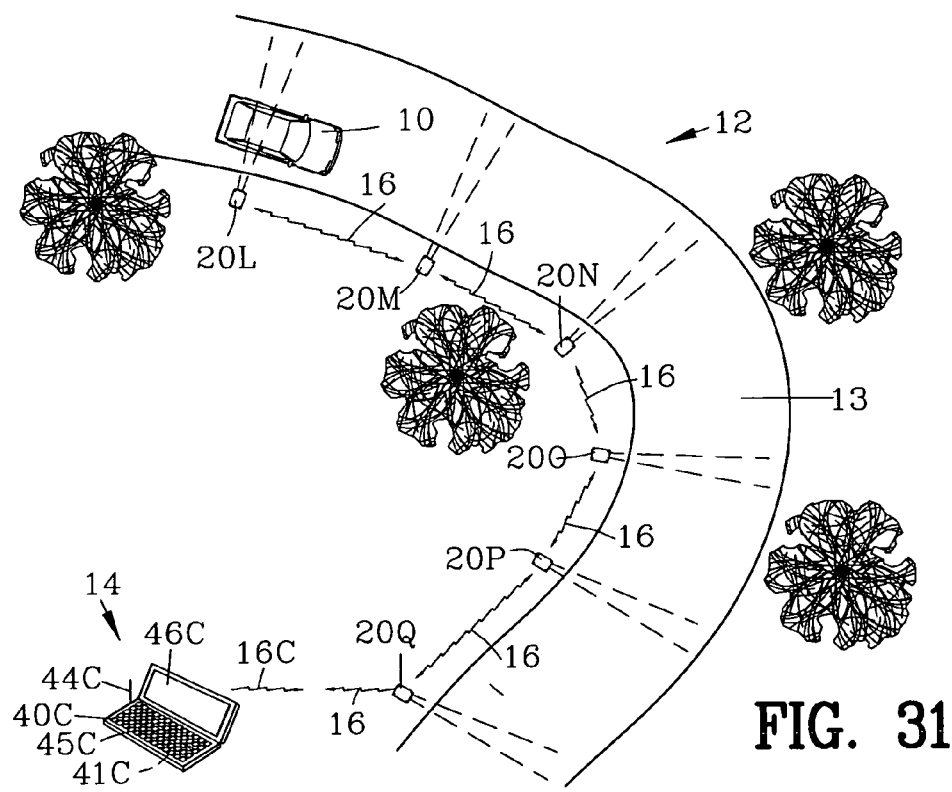
FIG. 31 is a plan view of a plurality of sensor nodes arranged along a path.

FIG. 31 is a plan view of a plurality of sensor nodes 20L-20Q arranged along a path shown as a road 13 within the region 12. The plurality of sensor nodes 20L-20Q detect and image the object 10 as the object 10 moves along the road 13.

In this example, the plurality of sensor nodes 20L-20Q sequentially transmit the images of the object 10 from the sensor node 20L to the sensor node 20Q as indicated by the arrows 16. The sequentially transmission of the images of the object 10 from the sensor node 20L to the sensor node 20Q extend the range of transmission of the device 5. The sensor node 20Q transmits the images of the object 10 to the display node 40C.

Figure 32:
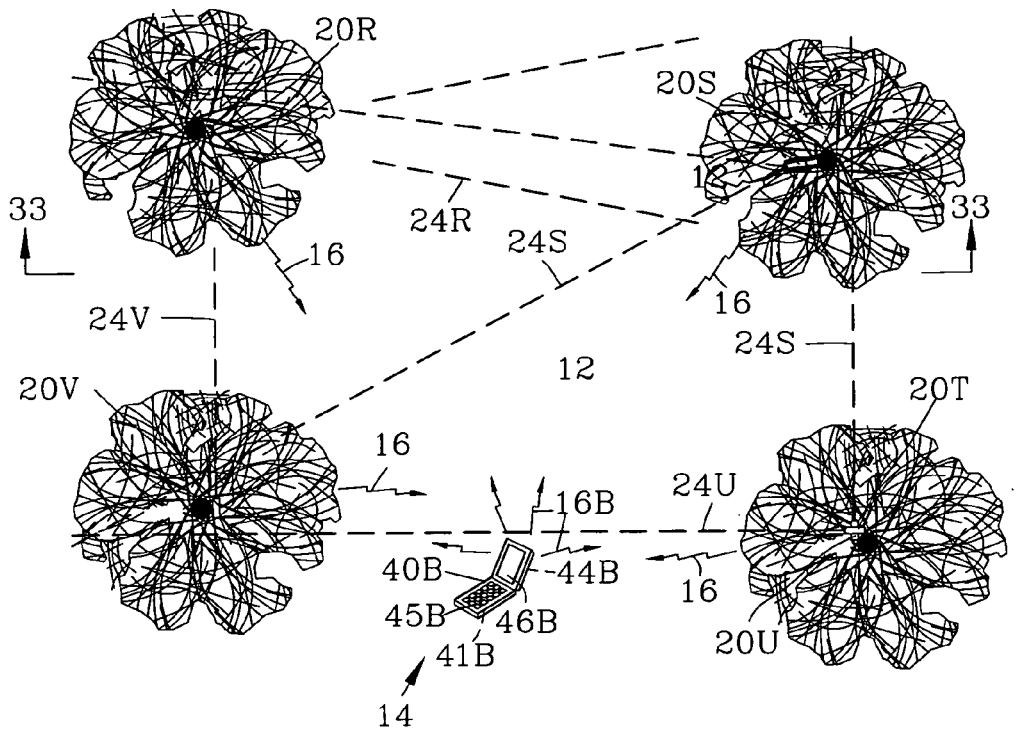
FIG. 32 is a plan view of a plurality of sensor nodes arranged about a central area.

FIG. 32 is a plan view of a plurality of sensor nodes 20R-20V arranged about a central region 12. The sensor nodes 20R and 20S are established to sense an object 10 within a field of view as shown in FIGS. 11 and 12. The sensor nodes 20T-20V are established to sense an object 10 crossing a single beam as shown in FIG. 10. In this example, each of the plurality of sensor nodes 20R-20V communicates directly with the display node 40B. Some of the plurality of sensor nodes 20R-20V are arrange to monitor others of the plurality of sensor nodes 20R-20V as a deterrent to tampering and/or theft.

Figure 33:
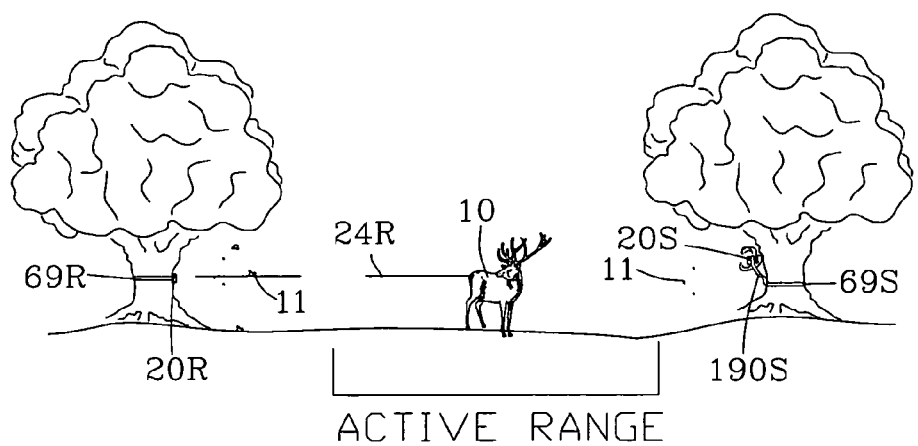
FIG. 33 is a view along line 33-33 in FIG. 32.

FIG. 33 is sectional view along line 33-33 in FIG. 32 illustrating the active range previously set forth with reference to FIG. 7. In this example, the object 10 is located within the active range whereas fault objects 11 are found outside of the active range. The object 10 is shown as an animal whereas the fault objects 11 are shown as falling leaves.

Referring back to FIG. 7, the range detector 92 determines the range of the object 10 within the region 12 by timing the duration between the emission of the pulsed laser waveforms 81W and the reception of the reflected pulsed laser waveforms 82W. The active range detector 93 determines if the object 10 is located within a desired or active range from the sensor node 20. The active range detector 93 provides an output to a camera trigger 94 only when the range of the object 10 falls within the active range from the sensor node 20. The sensor detects 20R the object 10 and ignores the fault objects 11.

FIG. 33 illustrates an alternative mounting for the sensor 20S. In this example, a synthetic branch 190S supports the sensor 20S from the tree. In addition, the synthetic branch 190S camouflages the sensor 20S. It should be appreciated b those skilled in the art that numerous method may be used for mounting and/or camouflaging the sensor 20S.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A device for detecting and imaging an object, comprising:
   a sensor node including:
   a sensor microcomputer;
   a laser range finder for sensing the presence and determining the range of the object;
   a night vision optical amplifier coupled to said laser range finder;
   an active range detector connected to said sensor microcomputer for determining if the object is located within a desired active range from the sensor node;
   said active range detector providing an output to a camera trigger only when the range of the object falls within said desired active range from the sensor node for distinguishing between objects within said active range from fault objects found outside of said active range;
   a camera comprising an electronic imaging device optically coupled to said night vision optical amplifier for recording an image of the object with a matrix of electronic pixels upon an output from said laser range finder;
   a connector for connecting said camera to said sensor microcomputer;
   an infrared sensor for sensing the infrared emission from the object;

an infrared laser connected to said sensor microcomputer for emitting an infrared waveform toward the object upon actuation by said microcomputer;

a first and a second lenticular lenses interposed between the infrared laser and the object for expanding said infrared waveform in two additional dimensions for illuminating the object;

said microcomputer actuating said infrared laser upon said infrared sensor sensing an insufficient light level from the object for illuminating the object through said first and second lenticular lenses for enabling said camera to record an image of the object by said camera;

a sensor radio connected to said sensor microcomputer for transmitting said recorded image of the object;

a display node including:

a display microcomputer;

a display radio connected to said display microcomputer for receiving said recorded image of the object; and a display device for displaying the image of the object.

2. A device for detecting and imaging an object as set forth in claim 1, wherein said sensor radio is a wireless radio frequency sensor transceiver.

3. A device for detecting and imaging an object as set forth in claim 1, wherein said sensor radio is a sensor transceiver selected from the group consisting of a 802.15 wireless transceiver, a cellular transceiver and a satellite transceiver.

4. A device for detecting and imaging an object as set forth in claim 1, including a sensor auxiliary device selected from the group consisting of:

a motion sensor for sensing a motion of the object, a presence sensor for sensing a presence of the object, a heat sensor for sensing a heat emission from the object, an infrared sensor for sensing an infrared emission from the object, an acoustic sensor for sensing an acoustical output from the object, an ultrasonic sensor for sensing an ultrasonic output from the object, a vibration sensor for sensing the level of vibration from the object, an acceleration sensor for sensing the level of acceleration of the object, a pressure sensor for sensing the level of pressure from the object, an inclination sensor for sensing the level of inclination of the object, a magnetic sensor for sensing a magnetic field of the object, an aroma sensor for sensing an aroma from the object, a sonar sensor for sensing a sonar signal from the object, and a radar sensor for sensing a radar signal from the object, and a radio frequency sensor for sensing a the radio frequency signal from the object, a magnetic compass for sensing a magnetic direction; and a light sensor for determining the level of ambient light.

5. A device for detecting and imaging an object as set forth in claim 1, including a sensor auxiliary device selected from the group consisting of:

a disabling circuit for disabling said sensor node;

a global positioning system (GPS) receiver for determining the geographical position of said sensor node; and a light emitting device for illuminating the object for recording an image of the object in a low light condition.

6. A device for detecting and imaging an object as set forth in claim 1, wherein said camera includes a night vision unit coupled to said camera for enabling said camera to record an image of the object in a low light condition.

7. A device for detecting and imaging an object as set forth in claim 1, wherein said display radio is a display transceiver selected from the group consisting of:

an 802.15 wireless transceiver, a cellular transceiver, a satellite transceiver, and a USB port.

8. A device for detecting and imaging an object as set forth in claim 1, wherein said display node includes a display auxiliary device selected from the group consisting of:

an alarm circuit for alerting an operator upon said display radio receiving said recorded image of the object; and a GPS receiver.

* * * * *